US010430697B2

(12) United States Patent
Nakamura

(10) Patent No.: US 10,430,697 B2
(45) Date of Patent: Oct. 1, 2019

(54) PRINTER AND METHOD FOR PROCESSING STRING INFORMATION

(71) Applicant: SEIKO EPSON CORPORATION, Tokyo (JP)

(72) Inventor: Hideo Nakamura, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 7 days.

(21) Appl. No.: 15/794,735

(22) Filed: Oct. 26, 2017

(65) Prior Publication Data
US 2018/0121770 A1 May 3, 2018

(30) Foreign Application Priority Data

Oct. 27, 2016 (JP) ................ 2016-210305

(51) Int. Cl.
G06K 15/02 (2006.01)
G06F 3/12 (2006.01)
(Continued)

(52) U.S. Cl.
CPC ............ *G06K 15/181* (2013.01); *B41J 11/66* (2013.01); *G06F 3/0659* (2013.01);
(Continued)

(58) Field of Classification Search
None
See application file for complete search history.

(56) References Cited

U.S. PATENT DOCUMENTS 4,710,886 A * 12/1987 Heath ................ G06F 3/1297
358/1.18
5,103,303 A * 4/1992 Shoji ................ G06K 15/02
358/1.11
(Continued)

FOREIGN PATENT DOCUMENTS

EP 0 593 190 A2 4/1994
EP 1 816 558 A2 8/2007
(Continued)

OTHER PUBLICATIONS

Extended European Search Report dated Mar. 8, 2018 in related European Appl. No. 17198038.6 (9 pgs.).
(Continued)

Primary Examiner — Scott A Rogers
(74) Attorney, Agent, or Firm — Foley & Lardner LLP

(57) ABSTRACT

A printer including: a receive buffer that receives string information indicating a strong including one or more substrings; a storage storing data defined by a specific rule; a command string generator that generates, for each substring in the string information received by the receive buffer, a command string including a command and the substring based on information stored in the storage indicating the style of each sub string, a command executor that generates image data according to the one or more commands in the one or more command strings generated by the command string generator; a print buffer for storing the image data generated by the command executor; and a printing mechanism that prints based on the image data stored in the print buffer.

18 Claims, 24 Drawing Sheets

(51) Int. Cl.
*B41J 11/66* (2006.01)
*G06F 3/06* (2006.01)

(52) U.S. Cl.
CPC .......... *G06F 3/1206* (2013.01); *G06F 3/1244* (2013.01); *G06F 3/1285* (2013.01); *G06K 15/022* (2013.01); *G06K 15/1802* (2013.01); *G06K 15/1807* (2013.01); *G06K 15/1817* (2013.01)

(56) References Cited

U.S. PATENT DOCUMENTS

| | | | |
|---|---|---|---|
| 2002/0005960 A1* | 1/2002 | Yada | G06K 15/00 358/1.1 |
| 2003/0164957 A1 | 9/2003 | Komaki | |
| 2005/0078995 A1 | 4/2005 | Bever et al. | |
| 2007/0182978 A1* | 8/2007 | Nakamura | G06F 3/1206 358/1.13 |
| 2008/0239359 A1* | 10/2008 | Kadota | G06K 15/02 358/1.13 |
| 2008/0304107 A1 | 12/2008 | Yamakawa | |
| 2010/0100810 A1 | 4/2010 | Nakamura et al. | |
| 2015/0347877 A1 | 12/2015 | Kanda et al. | |
| 2016/0103636 A1 | 4/2016 | Tajima et al. | |

FOREIGN PATENT DOCUMENTS

| | | |
|---|---|---|
| EP | 2 645 306 A2 | 10/2013 |
| JP | 05-193223 A | 8/1993 |
| JP | 2008-305348 A | 12/2008 |
| JP | 2010-097544 A | 4/2010 |
| JP | 2010-146374 A | 7/2010 |
| JP | 2015-227001 A | 12/2015 |
| WO | WO-03/053703 A1 | 7/2003 |
| WO | WO-2016/027482 A1 | 2/2016 |

OTHER PUBLICATIONS

The Linux Information Society (LINFO), "What is a String?"—String Definition, updated Jun. 17, 2007, http://www.linfo.org/string.html.

* cited by examiner

PRINTER AND METHOD FOR PROCESSING STRING INFORMATION

BACKGROUND

1. Technical Field

The present disclosure relates to a printer and a control method of a printer.

2. Related Art

Printers that print based on data received from an external device are known from the literature. JP-A-2010-146374, for example, describes a printer that receives variable data including formatting data specifying a printing format from a terminal device (an external device), and based on the formatting data defining the content of the printing format defined by the formatting data, executes a printing process based on the variable data.

Printers typically receive data, and command executing a process on the data, from an external device, and by executing the commands, print based on the received data. The external device stores an application and printer driver, generates the data by functions of the application, generates commands the printer can interpret by functions of the printer driver, and sends the data and commands to the printer. However, the external device may not have a printer driver, or the application may send the data to the printer without going through the printer driver. In this event, trying to print with the printer described in JP-A-2010-146374 is difficult for the user.

SUMMARY

The present disclosure provides for printing in a format desired by the user without encumbering the user.

A printer according to an aspect of the present disclosure includes: a receive buffer configured to receive string information indicating a string including one or more substrings segmenting the string; storage configured to store information indicating a style defined by a specific rule; a processor configured to respectively generate, for each of the one or more substrings in the string information received by the receive buffer, a command string including a command and the substring based on information stored in the storage indicating the style of each sub string, execute the one or more commands included in the generated one or more command strings, and generate image data; and a printing mechanism configured to print based on the image data.

Because this configuration generates a command string based on information defining the style of each substring in the string information, and then prints based on the command string, printing in a user-desired format is possible without encumbering the user.

In a printer according to another aspect of the present disclosure, the string is segmented into substrings by a delimiter; the style information corresponds to (or is selected based on) the number of substrings; and the processor identifies the substrings based on the delimiter, and generates the command string according to the style information based on the number of sub strings separated by the delimiter.

Because this configuration generates a command string based on style information corresponding to each substring delimited by a delimiter, strings corresponding to the number of substrings can be printed, and printing in a user-desired format is possible.

In a printer according to another aspect of the present disclosure, the storage stores at least printer information related to the printer and including information indicating the number of columns that can be printed on one line on the print medium; and the processor references the storage, and generates the command string based on the printer information.

Because this configuration generates a command string based on style information related to printer information including information indicating the number of printable columns, printing in a user-desired format appropriate to the length of the string is possible.

In a printer according to another aspect of the present disclosure, the storage stores font information for a first character code, and conversion information used to convert a second character code to the first character code; the processor, when the character code of the string indicated by the string information the receive buffer received is the second character code, converts the second character code to the first character code based on the conversion information, and generates the one or more command strings, and generates the image data based on the font information corresponding to the first character code.

Because this configuration generates a command string by converting a second character code to a first character code based on conversion information, printing in a user-desired format is possible even when string information containing character codes incompatible with the printer is received.

In a printer according to another aspect of the present disclosure, the style information is information specifying, for a substring, one or more of a printing position, a character style, a character size, a number format, an image printing, and a symbol image.

This configuration enables printing in a user-desired format because the style information includes at least one of the printing position, the character style, the character size, the number format, the image printing, and the symbol image.

A printer according to another aspect of the present disclosure also has at least one of a cutter to cut the print medium, a notification unit to report information, and an external device driver to drive an external device; the style information being information specifying at least one of operating the cutter, reporting by the notification unit, and driving the external device by the external device driver; and the processor executing at least one of operating the cutter, reporting by the notification unit, and driving the external device by the external device driver, according to the one or more command strings.

This configuration enables printing in a user-desired format because the style information is information specifying any of operating a cutter, reporting by a notification unit, and driving an external device by the external device driver.

In a printer according to another aspect of the present disclosure, the string includes an identification character identifying style information; the storage stores the identification character corresponding to the style information; and the processor generates the one or more command strings based on the style information corresponding to the identification character in the string.

This configuration generates a command string based on style information corresponding to an identification character included in a string, and can therefore print in a user-desired format is the string contains the identification character.

Another aspect of the present disclosure is a control method of a printer having a receive buffer configured to receive string information indicating a string including one or more substrings segmenting the string, and storage configured to store information indicating a style defined by a specific rule, the control method including: respectively generating, for each of the one or more substring in the string information received by the receive buffer, a command string including a command and the substring based on information stored in the storage indicating the style of each substring; executing the one or more commands included in the generated one or more command string, and generating image data; and printing based on the image data.

Because this configuration generates a command string based on information defining the style of each substring in the strings of the string information, and then prints based on the command string, printing in a user-desired format is possible without encumbering the user.

Other objects and attainments together with a fuller understanding of the present disclosure will become apparent and appreciated by referring to the following description and claims taken in conjunction with the accompanying drawings.

DESCRIPTION OF EMBODIMENTS

Figure 1:
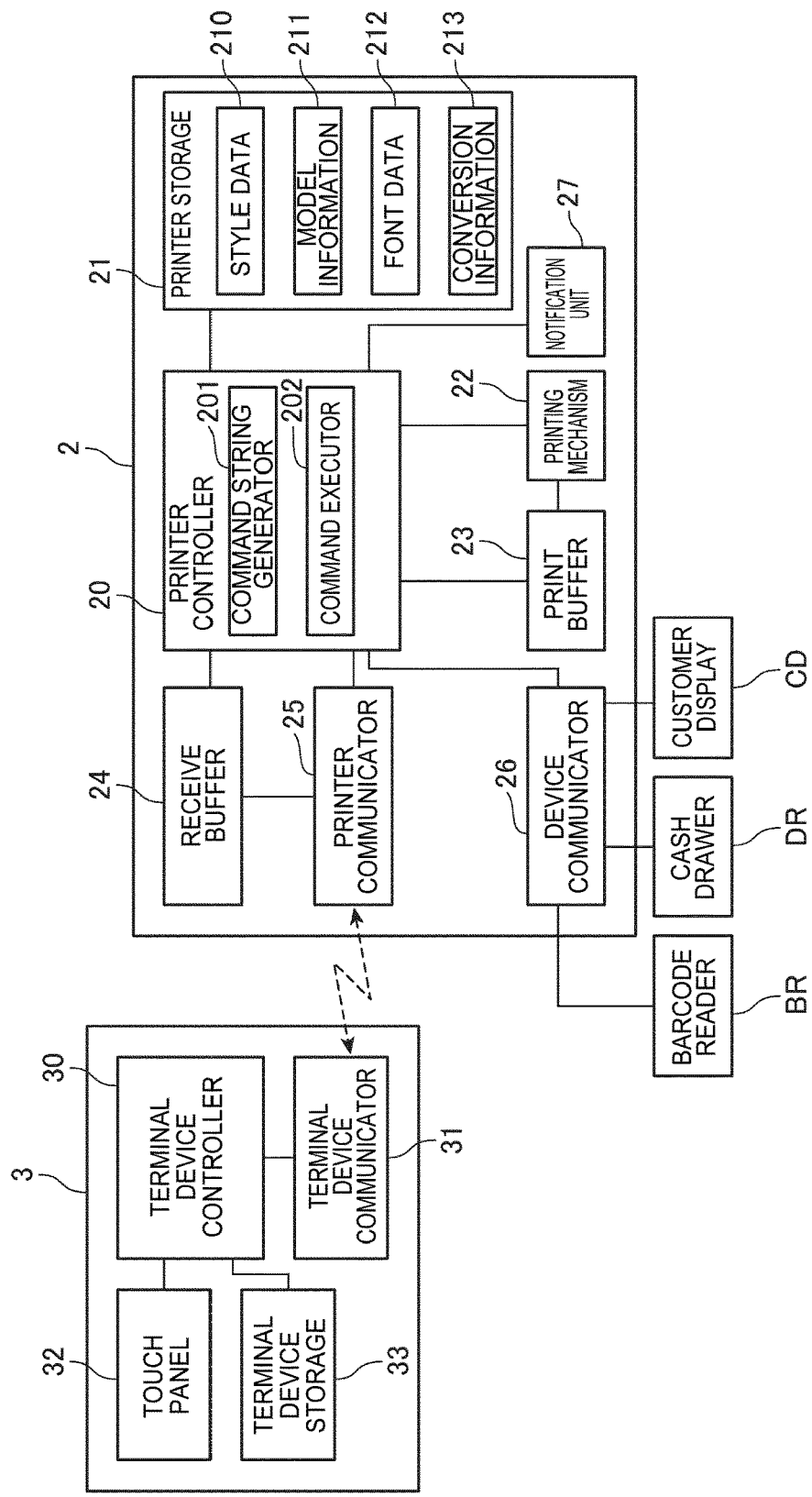
FIG. 1 is a block diagram illustrating the configuration of a printing system.

FIG. 1 illustrates the configuration of a printing system 1 according to the present disclosure.

The printing system 1 is a system used, for example, in a store such as a supermarket, convenience store, department store, or restaurant. The printing system 1 includes, for example, a function for processing transactions based on products purchased by a customer, and a function for producing transaction receipts.

As shown in FIG. 1, the printing system 1 includes a printer 2 (printing device) and a tablet terminal 3.

The printer 2 in this example is a thermal printer that holds roll paper (print medium) and prints images and text on the stored roll paper by forming dots with a thermal line head.

The printer 2 in this example uses a thermal printing method, but the printing method of the printer 2 is not limited to thermal printing, and may print by an inkjet printhead. The printhead of the printer 2 is also not limited to a line head, and may be a serial printhead.

Figure 2:
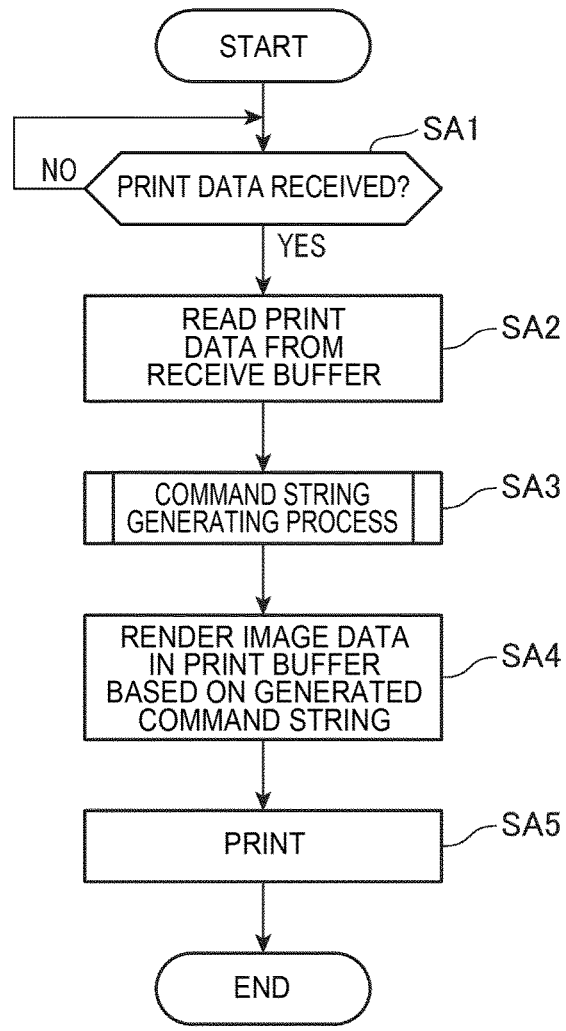
FIG. 2 is a flow chart of an example of printer operation.

As shown in FIG. 2, the printer 2 includes a printer controller 20, printer storage 21 (storage), printing mechanism 22, print buffer 23, receive buffer 24, printer communicator 25, device communicator 26 (external device driver), and notification unit 27.

The printer controller 20 includes a CPU (processor), ROM, RAM, and other control circuits not shown, and controls other parts of the printer 2. The printer controller 20, by reading and running a control program stored in ROM or printer storage 21, for example, functions as the command string generator 201 and command executor 202 described below.

The printer storage (memory) 21 may be a hard disk drive, EEPROM, or other type of nonvolatile storage, and stores data rewritably. In addition to control programs executed by the printer controller 20, the printer storage 21 stores style data 210 (information indicating a style), model information 211 (printer information), font data 212 (font information), and conversion information 213. The style data 210, model information 211, font data 212, and conversion information 213 are described below.

The printing mechanism 22 includes a conveyance mechanism for conveying the roll paper stored inside the case of the printer 2, a print mechanism for printing text and images by forming dots on the roll paper with a thermal head, a cutter mechanism for cutting the roll paper at a specific position, and other assemblies related to printing on roll paper. The printing mechanism 22 conveys the roll paper by the conveyance mechanism as controlled by the printer controller 20, prints text and images forming a receipt on the roll paper by the print mechanism, and cuts the roll paper at a specific position by the cutter mechanism, thereby producing a receipt.

The print buffer 23 is a temporary storage area in RAM, and in this example is a semiconductor memory device. As controlled by the printer controller 20, the print buffer 23 stores image data for the texts and images printed on the roll paper. The print buffer 23 may also be configured as a specific storage area in RAM of the printer controller 20.

The receive buffer 24 is a temporary storage area in RAM, and in this example is a semiconductor memory device. As controlled by the printer controller 20, the receive buffer 24 stores data received from an external device. In this example, the receive buffer 24 stores data received from the tablet terminal 3 by the printer communicator 25.

The printer communicator 25, as controlled by the printer controller 20, communicates with the tablet terminal 3 according to a specific wireless communication protocol. The wireless communication protocol used for communication between the printer 2 and tablet terminal 3 may be a wireless LAN standard compatible with an ad hoc mode, a wireless LAN standard compatible with an infrastructure mode, a near-field communication standard such as BLUETOOTH, or other standard.

The device communicator 26 has an interface board with a USB port, a serial communication port other than USB (such as RS-232C), a parallel communication port (such as IEEE 1284), a port compatible with a wired LAN standard (such as ETHERNET), or other type of communication port. A device (external device) can connect to each port. The device communicator 26, as controlled by the printer controller 20, communicates with devices connected to the printer 2 through the ports. The device communicator 26 may also have a wireless communication capability and be configured to communicate with devices wirelessly.

In this example, the device communicator 26 is an example of a device driver (external device driver) that drives a device.

Connected to the printer 2 as devices in this example are a barcode reader BR, a customer display CD, and a cash drawer DR.

The barcode reader BR reads barcodes on products or product packaging, and outputs data indicating the read result to the device communicator 26. The device communicator 26 also outputs data input from the barcode reader BR to the printer controller 20.

The customer display CD, as controlled by the printer controller 20, displays transaction-related information. Information displayed on the customer display CD can also be seen by the customer in the transaction.

The cash drawer DR has a tray for holding money and other receivables, and a kicker mechanism for kicking the tray out from the cash drawer.

The notification unit 27 in this example has LEDs or an LCD panel, and reports information as controlled by the printer controller 20. For example, the notification unit 27 may report specific information by driving one or multiple LEDs to turn on and off in a specific pattern.

The tablet terminal 3 is described next.

The tablet terminal 3 in this example is a tablet computer having a touch panel 32 disposed over a wide area of the surface. When processing a transaction, the tablet terminal 3 executes specific transaction-related processes, and functions as the host computer controlling the printer 2.

As shown in FIG. 2, the tablet terminal 3 includes a terminal device controller 30, terminal device communicator 31, touch panel 32, and terminal device storage 33.

The terminal device controller 30 includes a CPU (processor), ROM, RAM, and other control circuits not shown, and controls other parts of the tablet terminal 3.

The terminal device communicator 31, as controlled by the terminal device controller 30, communicates with the printer 2 according to a specific wireless communication protocol.

The touch panel 32 includes an LCD or other type of display panel, and a touch sensor overlaid to the display panel. The display panel, as controlled by the terminal device controller 30, displays images. The touch panel detects touch operations, and outputs to the terminal device controller 30. The terminal device controller 30, based on input from the touch sensor, executes processes corresponding to the touch operation.

The terminal device storage (memory) 33 may be a hard disk drive, EEPROM, or other type of nonvolatile storage, and stores data rewritably. The terminal device controller 30 executes programs stored in the terminal device storage 33, and controls other parts of the tablet terminal 3.

The general operation of the printer 2 and tablet terminal 3 of the printing system 1 is described next. This description supposes that a printer driver is already installed on the tablet terminal 3.

The terminal device controller 30 of the tablet terminal 3, by reading and running an application (such as a browser) previously installed on the tablet terminal 3, generate print data including the text and images to be printed on the roll paper stored in the printer 2. Included in the print data is at least string information defining the strings to be printed on the roll paper. The characters in the string are represented by specific character codes.

Next, the terminal device controller 30, by reading and running a printer driver previously installed on the tablet terminal 3, generates control commands in the command language of the printer 2 based on the print data generated by functions of the application. The control commands include at least a command instructing printing the string information included in the print data. This command is inserted in a string included in the print data, and is a command for driving the thermal head and conveyance mechanism so that a specific string is printed in a specific format at a specific position. The terminal device controller 30 sends the print data and control commands to the printer 2.

The printer controller 20 of the printer 2 receives the print data and control commands through the printer communicator 25, and, by executing processes indicated by the control commands, prints on the roll paper based on the print data.

The printer 2 may not print as desired by the user in cases such as described below.

In a first case, a printer driver is not installed to the tablet terminal 3.

As described above, the typical operation of a printer 2 and tablet terminal 3 in the printing system 1 supposes that a printer driver is previously installed to the tablet terminal 3. However, depending on the tablet terminal 3, a printer driver may not be installed. In this case, because a printer driver is not installed, the tablet terminal 3 cannot generate printing control commands, and sends print data to the printer 2 without control commands. As a result, the printer 2 may not be able to print in the format desired by the user.

In another case, the print data generated by the application (such as a browser) is sent directly to the printer 2 instead of through the printer driver installed on the tablet terminal 3.

In the former case, printing in the format desired by the user is possible by the user installing a printer driver to the tablet terminal 3, but if the user is not familiar with how to install a printer driver, installing the printer driver is not simple and the user is encumbered by the installation process.

In both the former and latter cases, printing in a user-desired format is possible if the application of the tablet terminal 3 has a function for generating commands for controlling the printer 2. However, inserting commands to the print data on the application side is difficult, and even if the commands are inserted, subsequently changing the strings included in the commands or print data is cumbersome.

A printer according to one or more embodiments therefore executes a process as described below.

Operation of the printer 2 is described below including a description of the command string generator 201 and command executor 202.

FIG. 2 is a flow chart of the operation of the printer 2.

The operation described in FIG. 2 supposes that print data (string information) is received from the tablet terminal 3 in CSV (comma-separated values) format. Print data in CSV format is data including one or more strings each separated by a "," (comma; a delimiter) on one line, and one or more lines each having one or more strings on one line. Note that a string may be as short as one character. In one or more embodiments, a delimiter other than a comma can be used (e.g. another character can be used).

The command string generator 201 of the printer 2 determines whether or not print data sent from the tablet terminal 3 was received (step SA1). Print data that is received is stored in the receive buffer 24.

Next, the command string generator 201 reads the print data received from the tablet terminal 3 from the receive buffer 24 (step SA2).

The command string generator 201 executes a command string generating process when the received print data is read from the receive buffer 24 (step SA3).

The command string generating process is described next.

Figure 3:
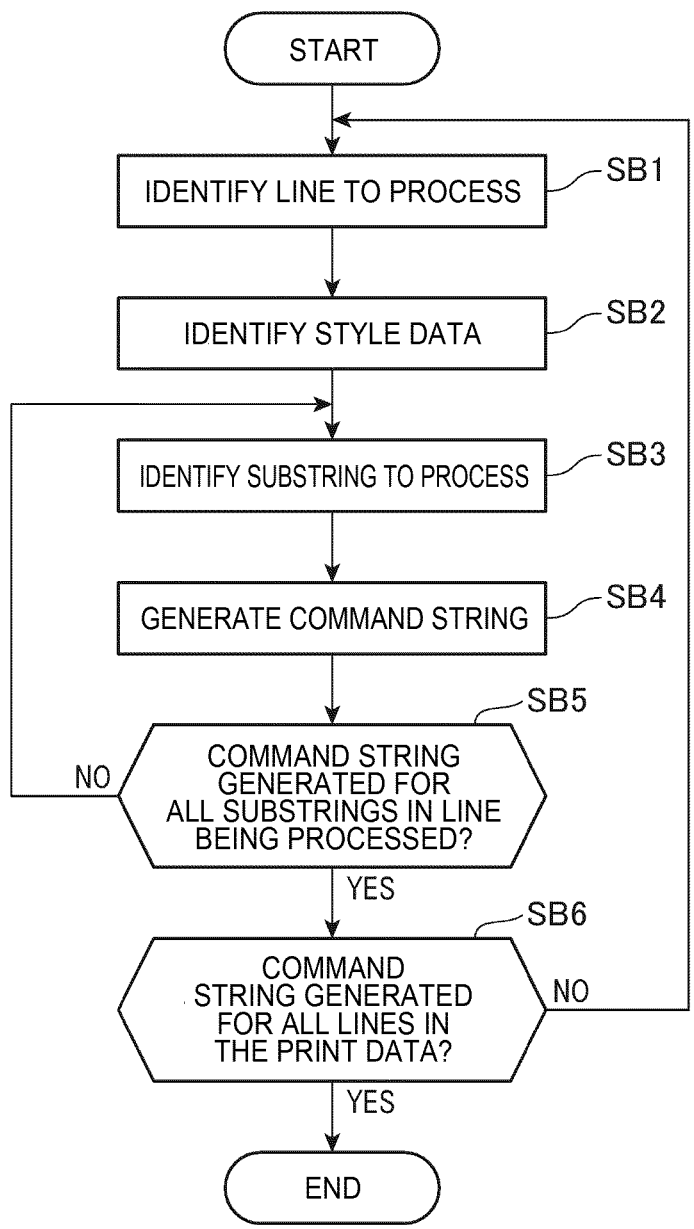
FIG. 3 is a flow chart of an example of printer operation.

FIG. 3 is a flow chart of printer 2 operation in the command string generating process.

The command string generator 201 first determines the one or multiple lines in the CSV format print data that are to be processed by step SB2-step SB5 (step SB1).

Next, the command string generator 201, based on a specific line, identifies the style data 210 to apply from the style data 210 stored in the printer storage 21 (step SB2).

Style data is described in further detail below, but is data specifying the printing format. Examples of the printing format in this embodiment include the printing position, character styles, number formats, image printing, symbol images, and operation of the cutter.

The printing position is the position where a substring (described below) is printed.

A character style indicates any style, such as underlining, that may be applied to a substring as described below.

A number format is the format used when printing numbers when the substring is a numeric string.

Image printing indicates printing a substring as a logo or other image.

A symbol image indicates printing a substring as an image, such as a barcode.

The style data 210 specifying the printing format is configured according to specific rules.

Next, the command string generator 201 identifies the substring to be processed in step SB4 from among the substrings in the line identified in step SB1.

A substring is one string delineated by a delimited (e.g. by the comma separator) in the strings on one line of the CSV format print data.

For example, the CSV format print data may comprise the following two strings.

Coffee M, 300
TOTAL, 300

In this example, the print data includes the string "Coffee M, 300", and the string "TOTAL, 300". In this example, the substrings of the first line include "Coffee M" and "300", and on the next line "TOTAL" and "300".

Next, the command string generator 201 generates a command string including commands instructing executing a process on the substrings identified in step SB3 based on the style data, and the substrings to be processed by the command processes (step SB4).

Next, the command string generator 201 determines if a command string was generated for all substrings included in the line identified in step SB1 (step SB5).

If a command string was not generated for all substrings identified in step SB1 (step SB5: NO), the command string generator 201 returns to step SB3, identifies the next substring to process, and generates a command string for that substring.

If a command string was generated for all substrings identified in step SB1 (step SB5: YES), the command string generator 201 determines if a command string was generated for all of the one or more lines included in the received CSV format print data (step SB6).

If the command string generator 201 determines a command string was not generated for all of the one or more lines in the received CSV format print data (step SB6: NO), control goes to step SB1. However, if the command string generator 201 determines a command string was generated for all of the one or more lines in the received CSV format print data (step SB6: YES), the command string generating process ends. In one or more embodiments, a respective command string need not be generated for each substring of each line before proceeding to step SA4.

Referring again to the flow chart in FIG. 2, when the command string generator 201 executes the command string generating process, the command executor 202, based on executing the generated command string, renders the image data in the print buffer 23 (step SA4), and then prints by the printing mechanism 22 based on the rendered image data (step SA5).

The operation of the command string generator 201 and command executor 202 (step SB1-step SB6, step SA4, step SA5) is described below with reference to several examples.

Example 1

Figure 4:
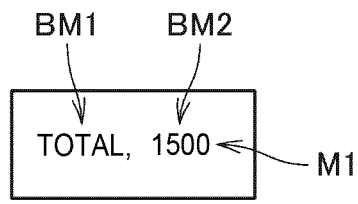
FIG. 4 shows an example of print data.

FIG. 4 shows an example of print data.

In the CSV format print data shown in FIG. 4, the string M1 includes the substring BM1 "TOTAL", and the substring BM2 "1500", separated by a comma.

When the command string generator 201 reads the CSV format print data shown in FIG. 4 from the receive buffer 24, it identifies the line to be processed in step SB2 to SB5 of the command string generating process. Because the print data in the example in FIG. 4 only includes the single line of string M1, the line containing the string M1 is identified (step SB1).

Next, once the line of string M1 is identified, the command string generator 201 identifies the style data 210 to apply based on the identified line (step SB2). In example 1, the command string generator 201 identifies the style data 210 corresponding to the number of substrings in the string M1. The command string generator 201 parses the number of substrings based on the commas. In other words, the substrings separated by commas in the string M1 in FIG. 4 are substring BM1 and substring BM2. As a result, the command string generator 201 determines the number of substrings in the string M1 is two. The command string generator 201 then retrieves from the printer storage 21 the style data 210 to apply when the number of substrings is two. Thus, the command string generator 201 may determine a total number of substrings in a line to be processed, and may select style data 210 to apply to the line to be processed (and to the substrings of the line to be processed) based on that determination.

Figure 5:
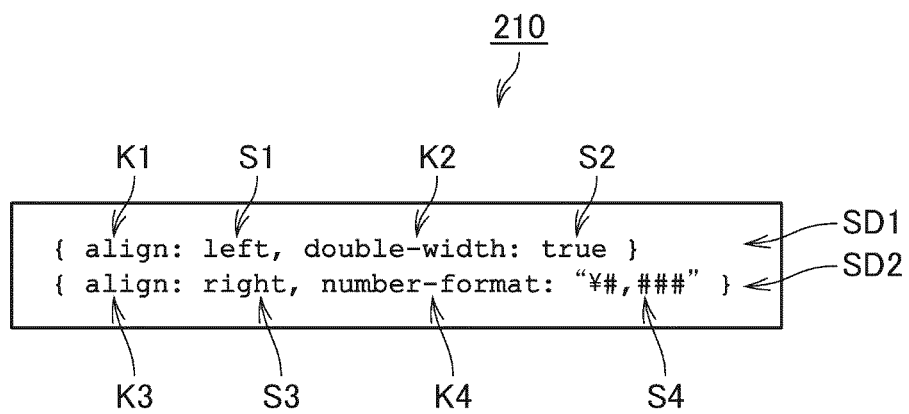
FIG. 5 shows an example of style data.

In a second example, the command string generator 201 identifies the style data 210 shown in FIG. 5 as the style data 210 to apply when the number of substrings is two.

FIG. 5 shows an example of style data 210. More specifically, FIG. 5 shows an example of the identified style data 210 separated by delimiters (e.g. commas) in the order of the substrings in the string M1. Although in the present example the delimiters of the style data 210 are of a same type as the delimiters of the print data (are commas), in other implementations the delimiters needs not be of the same type.

The style data 210 is JSON (JavaScript Object Notation) data in which the keys (or parameters) and values corresponding to the keys (key-value pairs) are separated by a colon (":").

The style data 210 shown in FIG. 5 includes style data SD1 and style data SD2. Style data SD1 and style data SD2 may be respectively referred to as a first portion of the style data 210 and as a second portion of the style data 210, or may be referred to as sub-data of the style data 210. The command string generator 201 may determine which portion of the style data 210 to apply to which sub-string based on one or more rules, such as, for example, a rule that portions of the style data 210 are to be applied in order to the substrings (e.g. a first portion of style data 210 corresponding to the first line of the style data 210 is to be applied to a first substring, a second portion of style data 210 corresponding to a second line of the style data 210 is to be applied to a second substring, and so on). Style data SD1 is style data applied to substring BM1 in FIG. 4. Style data SD2 is style data applied to substring BM2 in FIG. 4.

Style data SD1 relates the "align" property K1 and the property value S1 "left" corresponding to property K1, and the "double-width" property K2 and the property value S2 "true" corresponding to property K2.

Style data SD2 relates the "align" property K3, and the property value S3 "right" corresponding to property K3, and relates the "number-format" property K4 to the property value S4 "¥#, ###" corresponding to property K4.

The "align" property specifies the printing position, left alignment, right alignment, or center alignment, of the substring widthwise to the roll paper. In the style data SD1 in FIG. 5, the value of the "align" property K1 is set to "left". Here, "left" means the substring is printed aligned left. Therefore, in style data SD1, "align:left" sets the printing position of the substring to left alignment. As shown in FIG. 5, style data SD2 sets the "align" property K2 to "right". Here, "right" means the substring is printed aligned right. Therefore, in style data SD2, "align:right" sets the printing position of the substring to right alignment.

The "double-width" property specifies whether or not to print the substring with double-width characters (as used herein, twice the full-width size). The "double-width" property is set to "true" or "false". If set to "true", the substring is printed with double-width characters. If set to "false", the substring is not printed with double-width characters. Therefore, in style data SD1, "double-width:true" means that the substring is printed with double-width characters.

The "number-format" property specifies printing the substring in the format indicated by the property value. Style data SD2 in FIG. 5 sets the property value for the "number-format" property K4 to "¥#, ###". A property value of "¥#, ###" means that the substring is printed in the format "¥#, ###". Therefore, in style data SD2, the "number-format: "¥#, ###" means that the substring "1500" is printed as "¥1, 500". Note that "¥" here is the yen currency symbol for Japan, and "," means inserting a break (comma) every three characters. Other symbols and/or formats can be implemented in some embodiments.

When the command string generator 201 identifies the style data 210 shown in FIG. 5, it generates a command string for each substring in the order of the substrings based on the style data 210 (step SB4). As described above, the string M1 in FIG. 4 includes substring BM1 and sub string BM2.

The command string generator 201 first generates a command string based on the style data 210 shown in FIG. 5 for substring BM1. As described above, the style data 210 applied to substring BM1 is style data SD1. Style data SD1 is style data specifying printing the sub string double-width, left-aligned. The command string generator 201 therefore generates a command string for substring BM1 of string M1 including a command specifying the printing position as left-aligned, a command specifying double-width characters, and the substring BM1.

When a command string is generated for substring BM1 of string M1, the command string generator 201 determines if a command string was generated for all substrings on the line containing string M1 (step SB5). As shown in FIG. 4, because string M1 includes substring BM1 and substring BM2, the command string generator 201 in this case determines that a command string was not generated for all substrings in the line containing string M1, and generates a command string for substring BM2.

As described above, style data 210 applied to substring BM2 is style data SD2. Style data SD2 is style data specifying printing the substring right-aligned using the number format "¥#, ###". As a result, the command string generator 201 generates, for substring BM2 in string M1, a command string including a command specifying the printing position as right-aligned, a command specifying printing using the format "¥#, ###", and the substring BM1.

When a command string is generated for substring BM2, the command string generator 201 determines that a command string was generated for all substrings in the line containing string M1 (step SB5: YES). The command string generator 201 then determines whether or not a command string was generated for all of the one or more lines in the received CSV format print data (step SB6). Because the print data in the example in FIG. 4 includes only the line containing string M1, the command string generator 201 determines, once a command string was generates for substring BM1 and substring BM2, that a command string was generated for all of the one or multiple lines in the received CSV format print data (step SB6: YES), and ends the command string generating process.

When the command string generator 201 executes the command string generating process, the command executor 202 renders (generates) image data based on executing the generated command strings in the print buffer 23 (step SA4), and controls the printing mechanism 22 to print based on the image data (step SA5).

Figure 6:
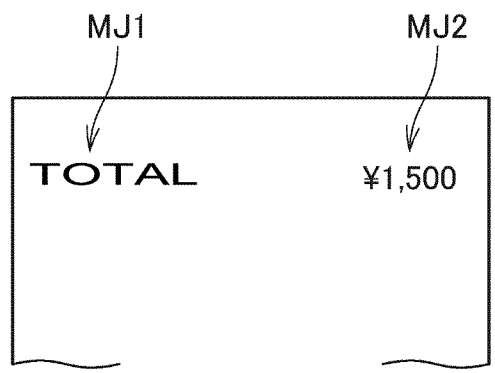
FIG. 6 shows an example of a printout.

FIG. 6 shows an example of the resulting printout. More particularly, the printout shown in FIG. 6 is the result of applying the command strings generates based on the style data in FIG. 5 to the print data shown in FIG. 4.

As described above, the command string generator 201 generates, for substring BM1 in string M1, a command string including a command setting the printing position to left-aligned, a command specifying printing double-width characters, and the substring BM1. Next, the command string generator 201, for substring BM2 in string M1, generates a command string including a command setting the printing position to right-aligned, a command specifying printing double-width characters, and the substring BM1.

As a result, by executing the generated command string, the substring BM1 indicating TOTAL is printed left-aligned and double-width on the roll paper as shown in string MP indicating TOTAL in FIG. 6. Next, the substring BM2 indicating the string 1500 is printed right-aligned in the format ¥1,500 on the roll paper as indicated by the string MJ2 in FIG. 6.

Receipt information is also printed on a sales receipt. The receipt information typically includes the product name, product price, tax information, the payment amount, and other information commonly printed on receipts. Generally, numeric information such as product prices and payment information is printed right-aligned on the printed side of the issued receipt, and the item names corresponding to the numeric amounts are printed left-aligned. As a result, as shown in FIG. 6, by printing substring BM1 indicating the line item name left-aligned, and printing the substring BM2 containing the numeric value right-aligned, the appearance of the printout does not differ from a common receipt. As a result, by sending CSV format print data to the printer 2, the user can obtain a printout in the same format as a common receipt.

Example 1 illustrates the operation of the printer 2 when there are two substrings. In other words, by sending a "line item name, value" string to the printer 2, the user can get a printout that does not differ from a typical receipt. As a result, when a printer driver is not installed on the tablet terminal 3, and when CSV format print data is sent directly from the browser or other application to the printer 2, printing in the format desired by the user, such as printing a common receipt, is possible. To enable printing in the user-desired format, there is no need to insert or change commands inserted by the application on the tablet terminal 3 side, there is no need to install a printer driver when a printer driver is not installed, and the user is not encumbered.

A process based on style data corresponding to a case having two substrings is described in example 1 above, but the effect described above can be achieved by storing style data 210 corresponding to the number of substrings in the printer storage 21 in the order corresponding to the sequence of the substrings.

For example, suppose the style data 210 corresponding to a single substring specifies printing the substring centered (center-aligned) on the roll paper. In this case, the substring is printed center-aligned on the roll paper. Also suppose that the substring is a string identifying a logo or other image. In this case, the command executor 202 acquires image data for the logo or other image from the printer storage 21 based on the substring, and if the logo or other image can be printed, prints the logo center-aligned on the roll paper. In general, the bottom logo or top logo on a receipt is printed in the center of the width of the receipt. Therefore, by defining this style data 210, the user, by sending CSV format print data to the printer 2, can get a printout that does not differ from a common receipt. By setting the printing position for each substring in style data 210 defined according to the number of substrings, the printer 2 can print in the format, such as a common sales receipt, desired by the user by simply receiving the CSV format print data.

Example 2

Another example is described next.

In example 2, the model information stores information indicating the number of columns that can be printed on one line across the width of the roll paper. The model information is information related to the printer 2 and/or to a print medium. The number of columns that can be printed on one line corresponds to the number of characters that can be printed on one line.

In example 2, the model information stores information indicating the number of columns that can be printed on one line is "30".

Figure 7:
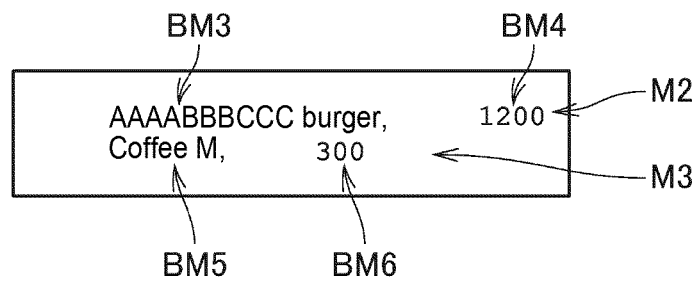
FIG. 7 shows an example of print data.

FIG. 7 shows an example of print data.

The print data shown in FIG. 7 is CSV data including string M2 and string M3. String M2 includes the substring BM3 "AAAABBBCCC burger", and the substring BM4 "1200" separated by a comma. String M3 includes the substring BM5 "Coffee M" and the substring BM6 "300", separated by a comma.

When CSV data is read from the receive buffer 24 as the print data shown in FIG. 7, the command string generator 201 identifies the lines to process in step SB2 to step SB5.

The lines in the print data shown in FIG. 7 are the line of string M2 and the line of string M3, and the line containing string M2 is identified first (step SB1).

Next, the command string generator 201, after identifying the line containing string M2, identifies the status data to apply in the order of the substrings based on the number of substrings in string M2, and the information identifying the number of printable columns in the model information (step SB2). In example 2, the number of printable columns in the model information is 30. As a result, the command string generator 201 identifies the style data setting the printing format so that the number of characters per line does not exceed the number of printable columns per line. Thus, the command string generator 201 identifies style data based on the number of characters that can be printed per line or should preferably be printed per line (e.g. according to a standard). In example 2, the command string generator 201 identifies the style data 210 shown in FIG. 8.

Figure 8:
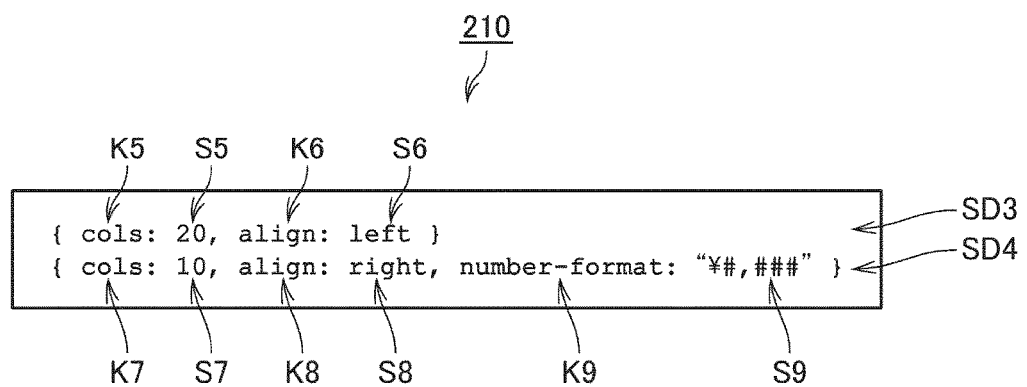
FIG. 8 shows an example of style data.

FIG. 8 shows an example of style data 210. More specifically, FIG. 8 shows the style data 210 identified based on string M2 in FIG. 7.

The style data 210 shown in FIG. 8 comprises style data SD3 and style data SD4. Style data SD3 is the style data applied to substring BM3 in FIG. 7. Style data SD4 is the style data 210 applied to substring BM4 in FIG. 7.

Style data SD3 relates the "cols (number of columns)" property K5 and the property value S5 "20" corresponding to property K5, and relates the "align" property K6 and the property value S6 "left" corresponding to property K6.

Style data SD4 relates the "cols" property K7 and the property value S7 "10" corresponding to property K7; relates the "align" property K8 and the property value S8 "right" corresponding to property K8; and relates the "number-format" property K9 to the property value "¥#, ###".

The "cols" property defines the number of characters in the substring that can be printed as half-width characters on one line. In the style data SD3 shown in FIG. 8, the property value of the "cols" property K5 is "20". The value "20" is a property value setting the number of half-width characters in the substring that can be printed on one line to 20. The key-value pair cols:20 in style data SD2 therefore sets the number of characters in the substring that can be printed half-width on one line is 20.

As shown in FIG. 8, style data SD4 sets the property value for the "cols" property K7 to "10". The argument "cols:10" in style data SD4 therefore sets the number of characters in the substring that can be printed half-width is 10. Thus, the style data can be selected such that the respective property values for the "cols" properties of the style data SD3 and the style data SD4 sum to a number equal to or less than the number of characters that can be printed per line or should preferably be printed per line. This selection (e.g. the summation) can account for a width of the characters (e.g. a value for one or more "width" properties).

The "align" property and "double-width" property are described further below.

When the style data 210 shown in FIG. 8 is identified, the command string generator 201 generates a command string based on the style data for each substring (step SB4). As described above, the string M2 shown in FIG. 7 includes substring BM3 and substring BM4. The command string generator 201 first generates a command string for substring BM3 based on style data SD3. Style data SD3 is style data setting, for the substring, the number of printable half-width characters to 20, and printing the substring left-aligned. As a result, the command string generator 201 generates a command string including, for substring BM3 of string M2, a command setting the number of printable half-width characters to 20, a left-aligned command, a command to execute printing, and the substring BM3.

After generating a command string for substring BM3 of string M2, the command string generator 201 generates a command string for substring BM4.

As described above, the style data 210 applied to substring BM4 is style data SD4. Style data SD4 is style data that sets, for the substring, the number of printable half-width characters to 10, specifies right-aligned printing, and sets the number format to "¥#, ###". As a result, for the substring BM4 in string M2, the command string generator 201 generates a command string including a command setting the number of printable half-width characters to 10, then a command setting the printing position to right-aligned, a command specifying printing using the format "¥#, ###", and the substring BM4.

When a command string is generated for substring BM4, the command string generator 201 determines a command string was generated for all substrings in the line of string M2 (step SB5: YES). The command string generator 201 then determines if a command string was generated for all of the one or multiple lines in the received CSV format print data (step SB6). In the example in FIG. 7, because there is a line of string M2 and a line of string M3, once the command string generator 201 generates a command string for substring BM3 and substring BM4, it goes to the next line containing string M3, and generates a command string for substring BM5 and substring BM6.

Once the command string generator 201 identifies the line of string M3, it identifies the style data 210 to apply in the order of the substrings based on the number of substrings in string M3 and the number of columns per line contained in the model information (step SB2). In example 2, the command string generator 201 identifies the style data 210 shown in FIG. 8.

The style data 210 shown in FIG. 8 includes style data SD3 and style data SD4. Style data SD3 is the style data 210 applied to substring BM5 in FIG. 7. Style data SD4 is the style data 210 applied to substring BM6 in FIG. 7.

Once the style data shown in FIG. 8 is identified, the command string generator 201 generates a command string based on the style data 210 for each substring (step SB4). As described above, the string M3 shown in FIG. 7 includes substring BM5 and substring BM6. The command string generator 201 first generates a command string for substring BM5 based on style data SD3. Style data SD3 is style data that sets the number of printable half-width characters for the substring to "20", and instructs printing left-aligned. As a result, the command string generator 201 generates, for substring BM5 of string M3, a command string including a command setting the number of printable half-width characters to "20", a command for printing left-aligned, a command instructing printing, and the substring BM5.

The command string generator 201, after generating a command string for substring BM5 of string M3, generates a command string for substring BM6.

As described above, the style data 210 applied to substring BM6 is style data SD4. Style data SD4 is style data that sets, for the substring, the number of printable half-width characters to "10", printing right-aligned, and printing using the format "¥#, ###". As a result, the command string generator 201 generates, for substring BM6 of string M3, a command string including a command setting the number of printable half-width characters to "10", a command setting the printing position to right-aligned, a command specifying printing using the format "¥#, ###", and the substring BM6.

Next, after generating a command string for substring BM6, the command string generator 201 determines if a command string was generated for all substrings included in the line containing string M3 (step SB5: YES). The command string generator 201 determines if a command string was generated for all of the one or more lines included in the received CSV format print data (step SB6). Because the example in FIG. 7 has a line containing string M2 and a line containing string M3, the command string generator 201 ends the command string generating process after generating command strings for substring BM5 and substring BM6.

When the command string generator 201 executes the command string generating process, the command executor 202, by executing the generated command strings, renders the image data in the print buffer 23 (step SA4), and then prints by the printing mechanism 22 (step SA5).

Figure 9:
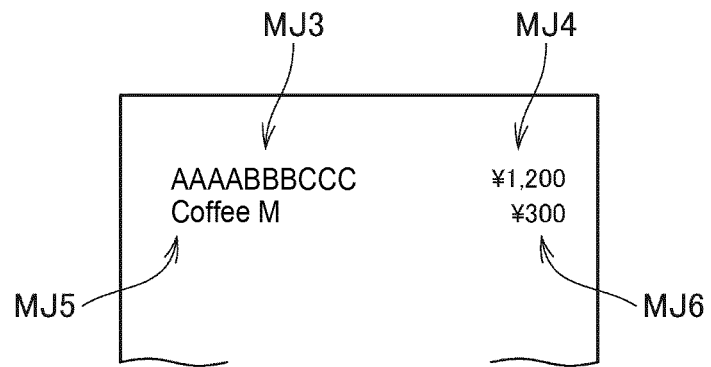
FIG. 9 shows an example of a printout.

FIG. 9 shows an example of the resulting printout. More particularly, the printout shown in FIG. 9 is the result of applying the command strings generates based on the style data 210 in FIG. 8 to the print data shown in FIG. 7.

As described above, the command string generator 201 generates, for substring BM3 of string M2 and substring BM5 of string M2, a command setting the number of printable half-width characters to "20", a command setting the printing position to left-aligned, and a command instructing printing. As a result, by executing the command string, the substring BM3 "AAAABBBCCC burger" is printed "AAAABBBCCC" as shown by characters MJ3 in FIG. 9, the number of characters is limited to 20 half-width characters, and the string is printed left-aligned. The characters MJ3 AAAABBBCCC are printed instead of "AAAABBBCCC burger" because the number of printable characters is 20 half-width characters, and the characters MJ3 are printed with double-width characters in this example. Furthermore, by executing the generated command string, the substring BM5 "Coffee M" is printed left-aligned as shown by the characters MJ5 "Coffee M" in FIG. 9. Unlike substring BM3, all characters in sub string BM5 are printed. This is because the string "Coffee M" in characters MJ5 is 19 columns (half-width characters) long.

The command string generator 201 also generates, for substring BM4 of string M2 and substring BM6 of string M3, a command setting the number of printable half-width characters to "10", a command setting the printing position to right-aligned, and a command instructing printing using the format "¥#,###". As a result, by executing the generated command string, the substring BM4 "1200" is printed right-aligned as "¥1, 200" as indicated by the characters MJ4 "¥1, 200" in FIG. 9. The substring BM6 "300" is similarly printed right-aligned as "¥300" as indicated by the characters MJ6 in FIG. 9.

As described above, the command string generator 201 identifies the style data based at least on the number of printable columns indicated by the model information, and generates a command string for each substring in order. As a result, printing with consideration for the number of printable columns is possible by printing based on executing the generated command string. Therefore, even when there is a large number of characters in a string on a line of the CSV format print data, disruption of the intended layout of the printout can be prevented. As a result, the printer 2 can print in the format, such as a common sales receipt, desired by the user by simply receiving the CSV format print data.

Example 3

Another example is described next.

Figure 10:
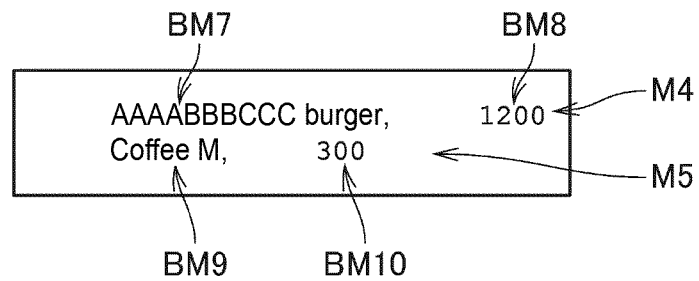
FIG. 10 shows an example of print data.

FIG. 10 shows an example of print data.

In example 3, the model information stores information indicating the number of columns that can be printed on one line is "30".

The print data shown in FIG. 10 is CSV format print data including string M4 and string M5. String M4 includes the substring BM7 "AAAABBBCCC burger", and the substring BM8 "1200", separated by a comma. String M9 includes the substring BM9 "Coffee M" and the substring BM10 "300", separated by a comma.

When CSV format print data is read from the receive buffer 24 as the print data shown in FIG. 10, the command string generator 201 identifies the lines to process in step SB2 to step SB5. The lines in the print data shown in FIG. 10 are the line of string M4 and the line of string M5, and the line containing string M4 is identified first (step SB1).

Next, the command string generator 201, after identifying the line containing string M4, identifies the status data to apply in the order of the substrings based on the number of substrings in string M4, and the information identifying the number of printable columns in the model information (step SB2). In example 3, the number of printable columns in the model information is 30. As a result, the command string generator 201 identifies the style data setting the printing format so that the number of characters per line does not exceed the number of printable columns per line. In example 3, the command string generator 201 identifies the style data 210 shown in FIG. 11.

Figure 11:
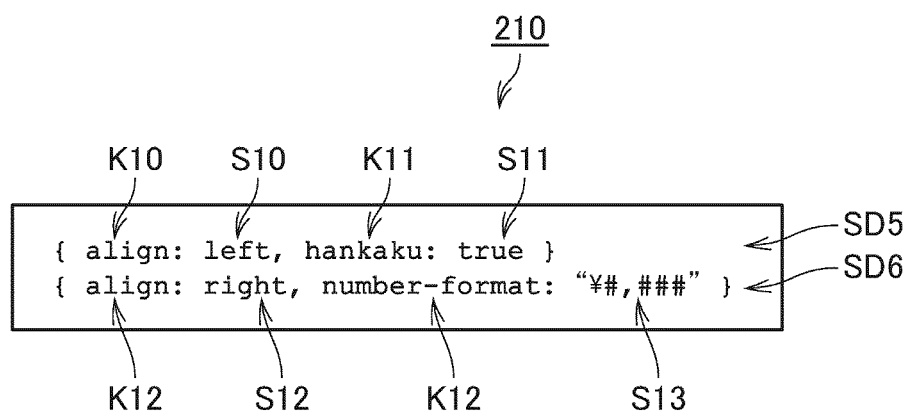
FIG. 11 shows an example of style data.

FIG. 11 shows an example of style data 210. More specifically, FIG. 11 shows the style data 210 identified based on string M4 in FIG. 10.

The style data 210 shown in FIG. 11 includes style data SD5 and style data SD6. Style data SD5 is the style data 210 applied to substring BM7 in FIG. 10. Style data SD5 is the style data 210 applied to substring BM8 in FIG. 10.

Style data SD5 relates the "align" property K10 to the property value S10 "left" corresponding to property K10, and relates the "hankaku" property K11 to the property value S11 "true" corresponding to property K11.

Style data SD6 relates the "align" property K12 to the property value S12 "right" corresponding to property K12, and relates the "number-format" property K13 to the format "¥#,###" corresponding to property K13.

The "hankaku" property specifies printing the substring with hankaku (half-width) characters. The property value of the "hankaku" property is either "true" or "false". A property value of "true" means the substring is to be printed with half-width characters. A property value of "false" means to not print the substring with half-width characters. Therefore, the "hankaku:true" argument in style data SD5 specifies printing with half-width characters.

The "align" property and "number-format" property are as described above.

When the style data 210 shown in FIG. 11 is identified, the command string generator 201 generates a command string based on the style data for each substring (step SB4). As described above, the string M4 shown in FIG. 10 includes substring BM7 and substring BM8. The command string generator 201 first generates a command string for substring BM7 based on style data SD5. Style data SD5 specifies printing the substring left-aligned with half-width characters. As a result, the command string generator 201 generates, for substring BM7 of string M4, a command string including a command setting the printing position to left-aligned, a command instructing printing with half-width characters, and substring BM7.

After generating a command string for substring BM7 of string M4, the command string generator 201 generates a command string for substring BM8.

As described above, the style data 210 applied to substring BM8 is style data SD6. Style data SD6 is style data that sets, for the substring, printing right-aligned using the number format "¥#,###". As a result, the command string generator 201 generates, for substring BM8 of string M4, a command setting the printing position to right-aligned, a command specifying printing using the format "¥#,###", and the substring BM8.

When a command string is generated for substring BM8, the command string generator 201 determines if a command string was generated for all substrings in the line of string M4 (step SB5: YES). The command string generator 201 determines if a command string was generated for all of the one or more lines included in the received CSV format print data (step SB6). In the example in FIG. 10, because there is a line of string M4 and a line of string M5, once the command string generator 201 generates a command string for substring BM7 and substring BM8, it goes to the next line containing string M5, and generates a command string for substring BM9 and substring BM10 in string M5.

Once the command string generator 201 identifies the line of string M5, it identifies the style data 210 to apply in the order of the substrings based on the number of substrings in string M5 and the number of columns per line contained in the model information (step SB2). In example 3, the command string generator 201 identifies the style data 210 shown in FIG. 11.

The style data 210 shown in FIG. 11 comprises style data SD5 and style data SD6. Style data SD5 is the style data 210 applied to substring BM9 in FIG. 10. Style data SD4 is the style data 210 applied to substring BM10 in FIG. 10.

Once the style data shown in FIG. 11 is identified, the command string generator 201 generates a command string based on the style data 210 for each substring (step SB4). As described above, the string M5 shown in FIG. 10 includes substring BM9 and substring BM10. The command string generator 201 first generates a command string for substring BM9 based on style data SD5. Style data SD5 is style data 210 setting printing left-aligned half-width characters. As a result, the command string generator 201 generates, for substring BM9 of string M5, a command string including a command setting the printing position to left-aligned, a command instructing printing with half-width characters, and the substring BM9.

The command string generator 201, after generating a command string for substring BM9 of string M5, generates a command string for substring BM10.

As described above, the style data applied to substring BM10 is style data SD6. Style data SD6 is therefore style data specifying printing the substring right-aligned in the format "¥#,###". As a result, the command string generator 201 generates, for substring BM9 of string M5, a command string including a command setting the printing position to right-aligned, a command specifying printing using the format "¥#,###", and the substring BM10.

Next, after generating a command string for substring BM10, the command string generator 201 determines if a command string was generated for all substrings included in the line containing string M5 (step SB5: YES). The command string generator 201 determines if a command string was generated for all of the one or more lines included in the received CSV format print data (step SB6). Because the example in FIG. 10 has a line containing string M4 and a line containing string M5, the command string generator 201 ends the command string generating process after generating command strings for substring BM9 and substring BM10.

When the command string generator 201 executes the command string generating process, the command executor 202, by executing the generated command strings, renders the image data in the print buffer 23 (step SA4), and then prints by the printing mechanism 22 (step SA5).

Figure 12:
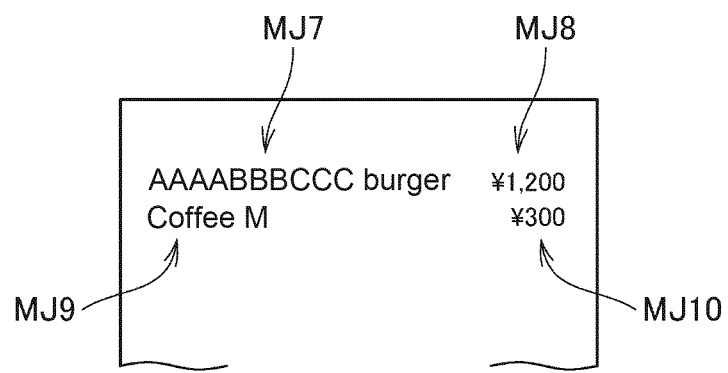
FIG. 12 shows an example of a printout.

FIG. 12 shows an example of the resulting printout. More particularly, the printout shown in FIG. 12 is the result of applying the command strings generates based on the style data 210 in FIG. 11 to the print data shown in FIG. 10.

As described above, the command string generator 201 generates, for substring BM7 of string M4 and substring BM9 of string M5, a command string including a left-aligned command and a command instructing printing with half-width characters. As a result, by executing the command string, the substring BM7 "AAAABBBCCC burger" is printed left-aligned as "AAAABBBCCC burger" as shown by characters MJ7 in FIG. 12. Furthermore, by executing the generated command string, the substring BM9 "Coffee M" is printed as left-aligned, half-width characters as shown by the characters MJ9 "Coffee M" in FIG. 12.

The command string generator 201 also generates, for substring BM8 of string M4 and substring BM10 of string M5, a command string including a right-aligned command and a command instructing printing using the format "¥#,###". As a result, by executing the generated command string, the substring BM8 "1200" is printed right-aligned as "¥1, 200" as indicated by the characters MJ8 "¥1, 200" in FIG. 12. The substring BM10 "300" is similarly printed right-aligned as "¥300" as indicated by the characters MJ10 in FIG. 12.

As described above, the command string generator 201 identifies the style data based at least on the number of printable columns indicated by the model information, and generates a command string for each substring in order. A command string limiting the number of printable characters is generated in example 2, but in example 3, the command string generator 201 generates a command string for printing the string using half-width characters. As a result, printing with consideration for the number of printable columns is possible by printing based on executing the generated command. Therefore, even when there is a large number of characters in a string on a line of the CSV format print data, disruption of the intended layout of the printout can be prevented. As a result, the printer 2 can print in the format desired by the user.

Example 4

Another example is described next.

Figure 13:
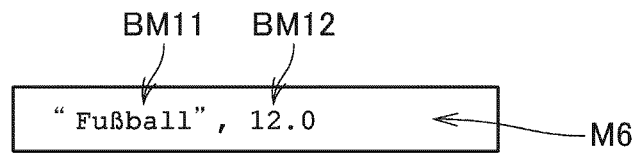
FIG. 13 shows an example of print data.

FIG. 13 shows another example of print data.

The print data shown in FIG. 13 is CSV format print data including string M6 containing the substring BM11 "Fußball", and the substring BM12 "12.0", separated by a comma. The substring BM11 includes the "ß" character used in one or more languages, including German.

When CSV format print data is read from the receive buffer 24 as the print data shown in FIG. 13, the command string generator 201 identifies the lines to process in step SB2 to step SB5. In the example in FIG. 13, the print data has one line containing only string M6, and the command string generator 201 therefore identifies the line containing string M6 (step SB1).

Next, the command string generator 201, after identifying the line of string M6, selects the style data based on the identified line (step SB2). In example 4, the command string generator 201 identifies the style data based on the number of substrings in string M6, and the character codes identifying the string M6. In example 2, the command string generator 201 identifies style data SD9 in FIG. 14.

Figure 14:
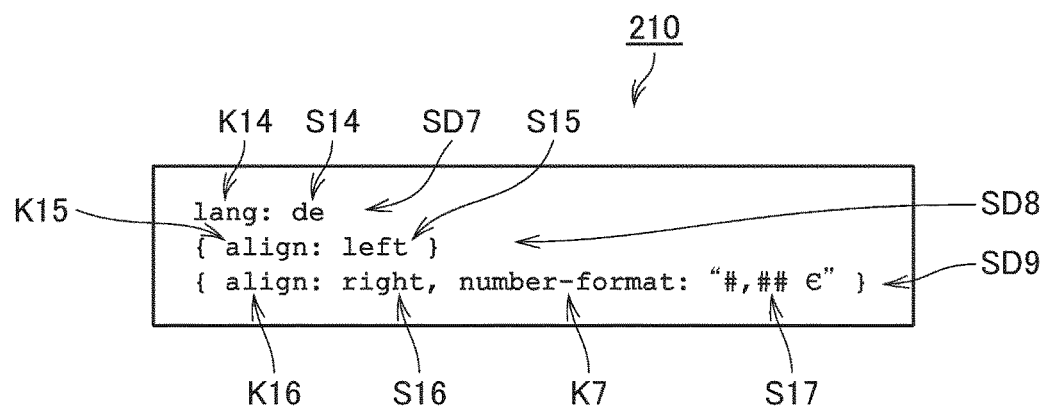
FIG. 14 shows an example of style data.

FIG. 14 shows an example of style data. More specifically, FIG. 14 shows the style data identified based on string M6 in FIG. 13.

The style data 210 shown in FIG. 14 includes style data SD7, style data SD8, and style data SD9. Style data SD7 is the style data applied to substring BM11 and substring BM12 in FIG. 13. Style data SD8 is the style data 210 applied to substring BM11 in FIG. 13. Style data SD9 is the style data 210 applied to substring BM12 in FIG. 13.

Style data SD7 relates the "lang" property K14 with the property value S14 "de" corresponding to property K14.

Style data SD8 relates the "align" property K15 to the property value S15 "left" corresponding to property K15.

Style data SD9 relates the "align" property K16 and the property value S16 "right" corresponding to property K16, and relates the "number-format" property K17 and the property value S17 "#,## €" to property K17. Note that the "€" in the property value S17 "#,## €" denotes the Euro currency symbol.

The "lang" property is a property specifying the language of the characters printed on the roll paper (and, for example, a corresponding "German" font). In the style data SD7 shown in FIG. 14, the property value of the "lang" property K14 is "de" where "de" is the value indicating German as the font of the characters to print. Therefore, in style data SD7, the argument "lang:de" specifies German as the language of the font of the characters printed on the roll paper.

The "align" property and the "number-format" property are as described above.

After identifying the style data 210 in FIG. 14, the command string generator 201 generates a command string based on the style data 210 for each substring (step SB4). As described above, the string M6 shown in FIG. 13 includes substring BM11 and substring BM12. The command string generator 201 first generates a command string for substring BM11 based on the style data. As described above, the style data 210 applied to substring BM11 is style data SD7 and style data SD8. As a result, for substring BM11 of string M6, the command string generator 201 generates a command string setting the language of the character font to German, a left-aligned printing command, and the substring BM11.

After generating a command string for substring BM11 of string M6, the command string generator 201 determines if a command string was generated for all substrings in the line of string M6 identified in step SB1 (step SB5). As shown in FIG. 13, because string M6 includes substring BM11 and substring BM12, the command string generator 201 determines a command string was not generated for all substrings in the line of string M6, and generates a command string for substring BM12.

As described above, the style data applied to substring BM12 is style data SD7 and style data SD9. As a result, the command string generator 201 generates a command string including a command setting the language of the character font to German, a command setting the printing position to right-aligned, a "#, ## €" formatting command, and the substring BM12. Note that the "€" in the property value S17 "#,## €" denotes the Euro currency symbol.

This example supposes that the characters in the string M6 are Unicode (second character code) characters. In other words, each character in the strings contained in the print data received from the tablet terminal 3 are Unicode characters. This also supposes that when the printer 2 prints the characters on roll paper, the character codes expressing the substrings in the command string are ASCII codes (second character codes). Some embodiments implement characters other than Unicode characters.

When the character code of the characters in string M6 are Unicode, the command string generator 201 converts the character code of each character from Unicode to ASCII based on the conversion information, and generates the command string.

The conversion information is information relating Unicode to ASCII code for each character. For substring BM11, the command string generator 201 generates a command string including substring BM11 in ASCII code, a command setting the language of the character font to German, and a command instructing printing left-aligned. For substring BM12, the command string generator 201 generates a command string including substring BM12 in ASCII code, a command setting the language of the character font to German, a command instructing printing right-aligned, and a command setting the format to "#, ## €". Note that the "€" in the format "#,## €" denotes the Euro currency symbol.

When a command string is generated for substring BM12, the command string generator 201 determines if a command string was generated for all substrings in the line of string M6 (step SB5: YES). The command string generator 201 determines if a command string was generated for all of the one or more lines included in the received CSV format print data (step SB6). Because there is only the line containing string M6 in FIG. 13, the command string generator 201, after generating a command string for substring BM11 and substring BM12, determines a command string was generated for all of the one or more objects in the received CSV format print data, and ends the command string generating process.

When the command string generator 201 executes the command string generating process, the command executor 202, by executing the generated command strings, renders the image data in the print buffer 23 (step SA4), and then prints by the printing mechanism 22 (step SA5).

Figure 15:
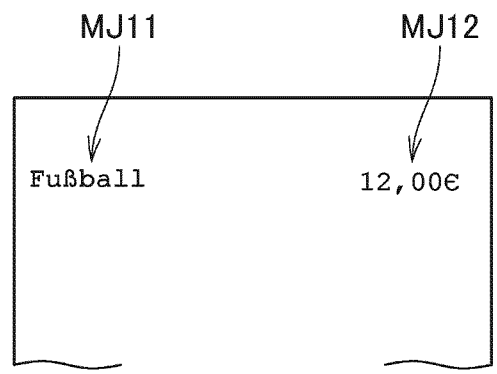
FIG. 15 shows an example of a printout.

FIG. 15 shows an example of the resulting printout. More particularly, the printout shown in FIG. 15 is the result of applying the command strings generated based on the style data 210 in FIG. 14 to the print data shown in FIG. 13.

As described above, the command string generator 201, for substring BM11 of string M6, generates a command string including setting the font language to German, a command instructing printing left-aligned, and the substring BM11. The command string generator 201, for substring BM12 of string M6, also generates a command string including setting the font language to German, a command instructing printing right-aligned, a command instructing printing using the format "¥#,###", and the substring BM12.

As a result, by executing the generated command string, the substring BM11 "Fußball", as shown by the characters MJ11 "Fußball" in FIG. 15, is printed in a German font and left-aligned. As shown in characters MJ12 in FIG. 15, the substring BM12 "12.0" is printed in German right-aligned, in the format "12.00€". Note that the "€" in "12.00€" denotes the Euro currency symbol.

The command string generator 201 references German font data to print characters MJ11 and characters MJ12. The font data is the actual data expressing the characters in a form that can be printed on roll paper, such as bitmap font data. For each character, the font data relates actual data to a character code. In this embodiment, the font data relates the actual data to an ASCII code for each character. When executing the generated command string on substring BM11 and substring BM12, the command string generator 201, by referencing German font data, prints characters MJ11 and characters MJ12 in a German font.

In this way, the command string generator 201 converts the character codes expressing the strings in the received print data to character codes that can be used by the printer 2 for printing, and generates the command string. In example 4, the command string generator 201 converts Unicode character codes to ASCII code, and generates a command string including the substring in ASCII code. The printer 2 can therefore print appropriately even when the character codes of the string contained in the received print data is not a character code compatible with the printer 2. The printer 2 can therefore print in the user-desired format.

Example 5

Another example is described next.

Figure 16:
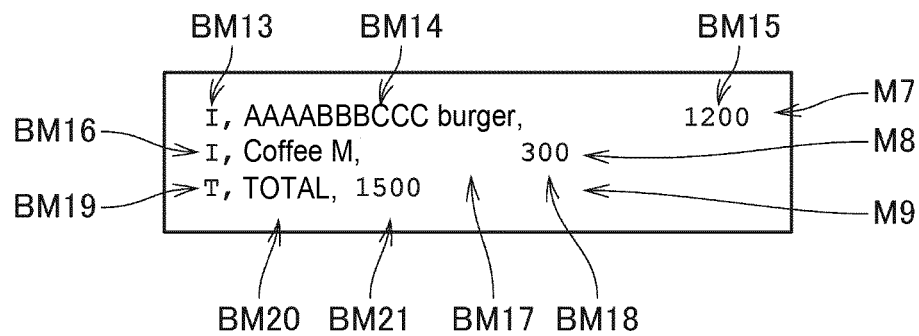
FIG. 16 shows an example of print data.

FIG. 16 shows an example of print data.

The print data shown in FIG. 16 is CSV format print data including string M7, string M8, and string M9.

String M7 includes, separate by a comma, the substring BM13 indicating "I", the substring BM14 indicating "AAAABBBCCC burger", and the substring BM15 indicating "1200".

String M8 includes, separated by a comma, the substring BM16 "I", the substring BM17 "Coffee M", and the substring BM18 "300".

The string M9 includes, separated by commas, the substring BM19 "T", the substring BM20 "Coffee M", and the substring BM21 "300".

When CSV format print data is read from the receive buffer 24 as the print data shown in FIG. 16, the command string generator 201 identifies the lines to process in step SB2 to step SB5. In FIG. 16, the lines in the print data include the line of string M7, the line of string M8, and the line of string M9, and the command string generator 201 first identifies the line of string M7 (step SB1).

Next, the command string generator 201, after indicating the line of string M7, identifies the style data corresponding to the first substring in the substrings of string M7 (step SB2). The substring at the beginning of string M7 is substring BM13.

Figure 17:
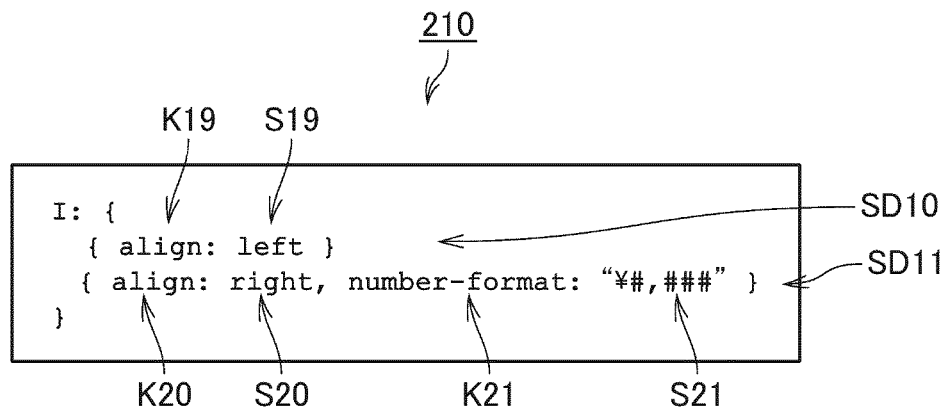
FIG. 17 shows an example of style data.

The command string generator 201 identifies the style data in FIG. 17 as the style data corresponding to substring BM13, which is the first substring in string M7. The command string generator 201 thus identifies the first substring as an identification string (identification character) identifying style data, and identifies the style data corresponding to the first substring.

FIG. 17 shows an example of style data 210. More specifically, FIG. 17 shows an example of style data 210 identified based on string M7 in FIG. 16.

The style data 210 shown in FIG. 17 comprises style data SD10 and style data SD11. Style data SD10 is the style data 210 applied to substring BM14 in FIG. 16. Style data SD11 is the style data 210 applied to substring BM15 in FIG. 16.

Style data SD10 relates the "align" property K19 to the property value S19 "left" corresponding to property K19.

Style data SD11 relates the "align" property K20 and the property value S20 "right" corresponding to property K20, and the "number-format" property K21 to the property value S21 corresponding to property K21 "¥#, ###".

The "align" property and "number-format" property are as described above.

After identifying style data 210 in FIG. 17, the command string generator 201 generates a command string based on the style data 210 for each substring (step SB4). As described above, the string M7 shown in FIG. 16 includes substring BM14 and substring BM15. The command string generator 201 first generates a command string for substring BM14 based on style data SD10.

Style data SD10 is style data setting the printing position of the substring to left-aligned. As a result, the printer command string generator 201, for substring BM14 of string M7, generates a command string including a left-aligned print command, a command instructing printing, and the substring BM14.

When the command string generator 201 generates a command string for substring BM14 of string M7, it then generates a command string for substring BM15.

As described above, the style data applied to substring BM15 is style data SD11. Style data SD11 is style data specifying printing the substring right-aligned in the format "¥#,###". As a result, the command string generator 201 generates, for substring BM15 of string M7, a command string including a command setting the printing position to right-aligned, a command specifying printing using the format "¥#, ###", and substring BM15.

When a command string is generated for substring BM14 and substring BM15, the command string generator 201 determines a command string was generated for all sub strings in the line of string M7 (step SB5: YES). The command string generator 201 then determines if a command string was generated for all of the one or more lines included in the received CSV format print data (step SB6). In the example in FIG. 16, because there is a line of string M7, a line of string M8, and a line of string M9, once the command string generator 201 generates a command string for substring BM14 and substring BM15, it goes to the next line containing string M8.

Once the command string generator 201 identifies the line of string M8, it identifies the style data 210 to apply to the first substring of the substrings in string M8 (step SB2). As shown in FIG. 16, the first substring in string M8 is the substring BM16 "T". As a result, the command string generator 201 identifies the style data 210 shown in FIG. 17.

The style data 210 shown in FIG. 17 comprises style data SD10 and style data SD11. Style data SD10 is the style data 210 applied to substring BM17 in FIG. 16. Style data SD11 is the style data 210 applied to substring BM18 in FIG. 16.

Once the style data shown in FIG. 17 is identified, the command string generator 201 generates a command string based on the style data 210 for each substring (step SB4). As described above, the string M8 shown in FIG. 16 includes substring BM17 and substring BM18. The command string generator 201 first generates a command string for substring BM17 based on style data SD10. Style data SD10 is style data instructing printing the substring left-aligned. As a result, the command string generator 201, for substring BM17 of string M7, generates a command string including a command instructing printing left-aligned, a command instructing printing, and substring BM17.

After generating a command string for substring BM17 of string M7, the command string generator 201 generates a command string for substring BM18.

The style data applied to substring BM18 is style data SD11. Style data SD11 is style data instructing printing the substring right-aligned using the format "¥#, ###". The command string generator 201 then generates a command string for substring BM18 of string M8 including a command setting the printing position to right-aligned, a command specifying printing using the format "¥#, ###", and substring BM18.

When a command string is generated for substring BM17 and substring BM18, the command string generator 201 determines a command string was generated for all sub strings in the line of string M8 (step SB5: YES). The command string generator 201 then determines if a command string was generated for all of the one or more lines included in the received CSV format print data (step SB6). In the example in FIG. 16, because there is a line of string M7, a line of string M8, and a line of string M9, once the command string generator 201 generates a command string for substring BM17 and substring BM18, it goes to the next line containing string M9.

Once the command string generator 201 identifies the line of string M9, it identifies the style data 210 to apply to the first substring of the substrings in string M9 (step SB2). As shown in FIG. 16, the first substring in string M9 is the substring BM16 "T". As a result, the command string generator 201 identifies the style data 210 shown in FIG. 18.

Figure 18:
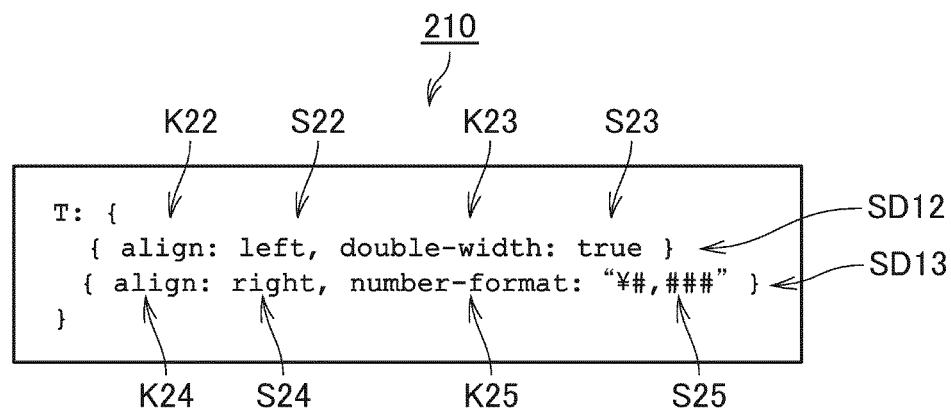
FIG. 18 shows an example of style data.

FIG. 18 shows an example of style data 210. More particularly, FIG. 18 shows the style data 210 identified based on the string M9 shown in FIG. 16.

The style data 210 shown in FIG. 18 comprises style data SD12 and style data SD13. Style data SD12 is the style data 210 applied to substring BM20 in FIG. 16. Style data SD13 is the style data 210 applied to substring BM21 in FIG. 18.

Style data SD12 relates the "align" property K22 to the property value S22 "left" corresponding to property K22, and relates the "double-width" property K23 to the property value S23 "true" corresponding to property K23.

Style data SD13 relates the "align" property K24 to the property value S24 "right" corresponding to property K24, and relates the "number-format" property K25 to the property value S25 specifying the format "¥#,###" for property K25.

The "align" property and "number-format" property are as described above.

Once the style data shown in FIG. 18 is identified, the command string generator 201 generates a command string for each substring based on the style data (step SB4). As described above, the string M9 shown in FIG. 16 includes substring BM20 and substring BM21. The command string generator 201 first generates a command string based on the style data for substring BM20. As described above, the style data applied to substring BM20 is style data SD12. Style data SD12 is style data specifying printing the substring left-aligned and double-width. As a result, the command string generator 201, for substring BM20 of string M9, generates a command string including a command setting the printing position to left-aligned, a command instructing printing double-width characters, and substring BM20.

The command string generator 201, after generating a command string for substring BM20 of string M9, generates a command string for substring BM21.

The style data applied to substring BM21 is style data SD13. Style data SD13 is command string generator 201 specifying printing the substring right-aligned using the format "¥#,###". As a result, the command string generator 201, for substring BM21 of string M9, generates a command string including a command setting the printing position to right-aligned, a command specifying printing using the format "¥#, ###", and substring BM21.

If the command string generator 201 determines a command string was generated for all substrings in the line containing string M9 (step SB5: YES), it determines if a command string was generated for all of the one or more lines included in the received CSV format print data (step SB6). In the example in FIG. 16, because there is a line of string M7, a line of string M8, and a line of string M9, once the command string generator 201 generates a command string for substring BM20 and substring BM21, it ends the command string generating process.

When the command string generator 201 executes the command string generating process, the command executor 202, by executing the generated command strings, renders the image data in the print buffer 23 (step SA4), and then prints by the printing mechanism 22 (step SA5).

Figure 19:
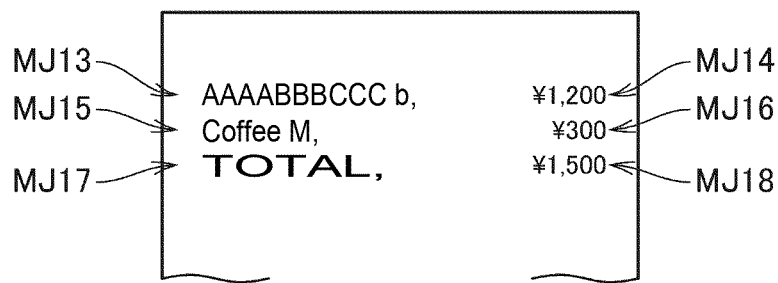
FIG. 19 shows an example of a printout.

FIG. 19 shows an example of the resulting printout. More particularly, the printout shown in FIG. 19 is the result of applying the command strings generates based on the style data in FIG. 17 and FIG. 18 to the print data shown in FIG. 16.

As described above, the command string generator 201, for substring BM14 of string M7 and substring BM17 of string M8, generates a command string including a command instructing printing left-aligned; and for substring BM20 of string M9, generates a command string setting the printing position to left-aligned and command instructing printing double-width characters. As a result, by executing the command string, the substring BM14 "AAAABBBCCC burger" is printed left-aligned as "AAAABBBCCC b" as shown by characters MJ13 in FIG. 19. In addition, the substring BM17 "Coffee M" is printed as left-aligned as shown by the characters MPS "Coffee M" in FIG. 19. The substring BM20 "TOTAL" is also printed as left-aligned, double-width characters as shown by the characters MJ17 "TOTAL" in FIG. 19.

The command string generator 201 also generates, for substring BM15 of string M7, substring BM18 of string M8, and substring BM21 of string M9, a command setting the printing position to right-aligned, and a command instructing printing using the format "¥#,###". As a result, by executing the generated command string, the substring BM15 "1200" is printed right-aligned as "¥1, 200" as indicated by the characters MJ14 "¥1, 200" in FIG. 19. The substring BM18 "300" is similarly printed right-aligned as "¥300" as indicated by the characters MJ16 in FIG. 19. The substring BM21 "1500" is also printed right-aligned as "¥1, 500" as indicated by the characters MJ18 "¥1, 500" in FIG. 19.

This embodiment uses the first substring in the string to determine the style data to apply (e.g. the first substring is a style identifier substring (or a style identifier character) that includes an identifier of a style data to apply), and the command string generator 201 generates a command string based on the style data indicated by the first substring. The style identifier substring need not be the first substring of the line of print data. Therefore, by receiving print data including a string wherein the string identifying the style data to apply is the first substring in the string, the printer 2 generates a command string based on the style data identified by the identifying substring, and can print in a format desired by the user.

Example 6

Figure 20:
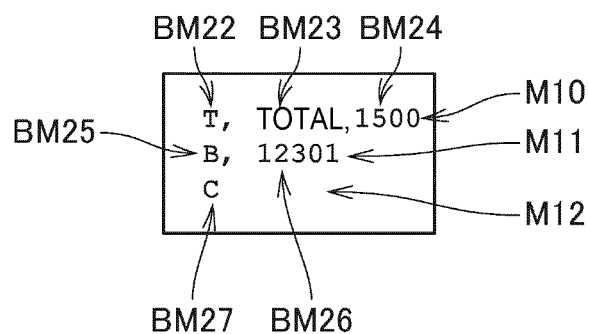
FIG. 20 shows an example of print data.

Another example is described next.
FIG. 20 shows an example of print data.
The print data shown in FIG. 20 is CSV format print data including string M10, string M11, and string M12. String M10 includes, separated by a comma, the substring BM22 "T", the substring BM23 "TOTAL", and the substring BM24 "1500". String M11 includes, includes, separated by a comma, the substring BM25 "B", and the substring BM26 "12301". String M12 contains the substring BM27 "C".

When CSV format print data is read from the receive buffer 24 as the print data shown in FIG. 20, the command string generator 201 identifies the lines to process in step SB2 to step SB5. In the example in FIG. 20, the lines in the print data include the line of string M10, the line of string M11, and the line of string M12, and the line of string M10 is identified first (step SB1).

Next, after identifying the line of string M10, the command string generator 201 determines the style data to apply to the first substring in string M10 (step SB2). The first substring in string M10 is substring BM22. The command string generator 201 then identifies the style data 210 shown in FIG. 21 as the style data to apply to substring BM22, which is the first substring in string M10.

Figure 21:
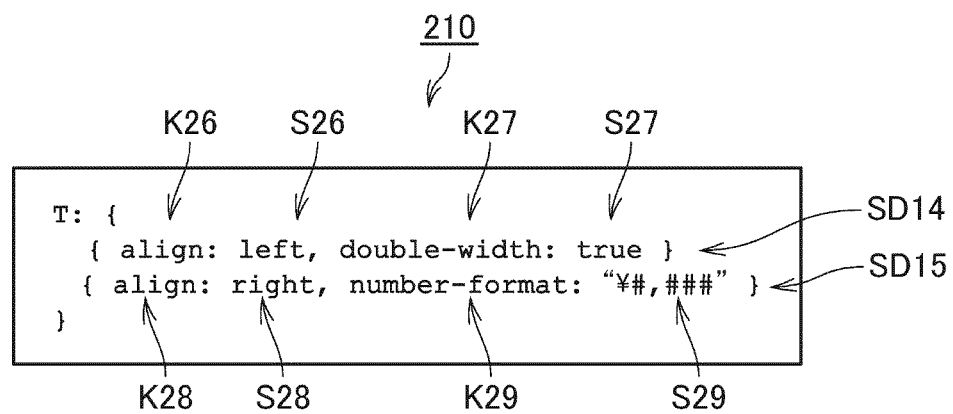
FIG. 21 shows an example of style data.

FIG. 21 shows another example of style data 210. More specifically, FIG. 21 shows the style data 210 identified based on the string M10 in FIG. 20.

The style data 210 shown in FIG. 21 comprises style data SD14 and style data SD15. Style data SD14 is the style data 210 applied to substring BM23 in FIG. 20. Style data SD15 is the style data 210 applied to substring BM24 in FIG. 20.

Style data SD14 relates the "align" property K26 to the property value S26 "left" corresponding to property K26, and relates the "double-width" property K27 to the property value S27 "true" corresponding to property K27.

Style data SD15 relates the "align" property K28 to the property value S28 "right" corresponding to property K28, and relates the "number-format" property K29 to the property value S29 setting the format to "¥#,###" for property K29.

The "align" property, "double-width" property, and "number-format" property are as described above.

After identifying the style data 210 shown in FIG. 21, the command string generator 201 generates a command string based on the style data 210 for each substring (step SB4). As described above, the string M10 shown in FIG. 20 includes substring BM23 and substring BM24. The command string generator 201 first generates a command string for substring BM23 based on style data SD14. Style data SD14 is style data setting the printing position of the substring to left-aligned, and the character width to double-width. As a result, the command string generator 201, for substring BM22 of string M10, generates a command string including a command instructing printing left-aligned, a command instructing printing double-width characters, and substring BM22.

After generating a command string for substring BM23 of string M10, the command string generator 201 generates a command string for substring BM24.

As described above, the style data applied to substring BM24 is style data SD15. The style data SD15 is style data specifying printing the substring right-aligned in the format "¥#,###". As a result, the command string generator 201, for substring BM24 of string M10, generates a command string including a command setting the printing position to right-aligned, a command specifying printing using the format "¥#, ###", and substring BM24.

When a command string is generated for substring BM23 and substring BM24, the command string generator 201 determines a command string was generated for all sub strings in the line of string M10 (step SB5: YES). The command string generator 201 then determines if a command string was generated for all of the one or more lines included in the received CSV format print data (step SB6).

In the example in FIG. 20, because there is a line of string M10, a line of string M11, and a line of string M12, once the command string generator 201 generates a command string for substring BM23 and substring BM24, it goes to the next line containing string M11.

Once the command string generator 201 identifies the line of string M11, it identifies the style data 210 to apply to the first substring of the substrings in string M11 (step SB2). As shown in FIG. 20, the first substring in string M11 is the substring BM25 "B". As a result, the command string generator 201 identifies the style data 210 shown in FIG. 22 corresponding to the substring BM25 "B".

Figure 22:
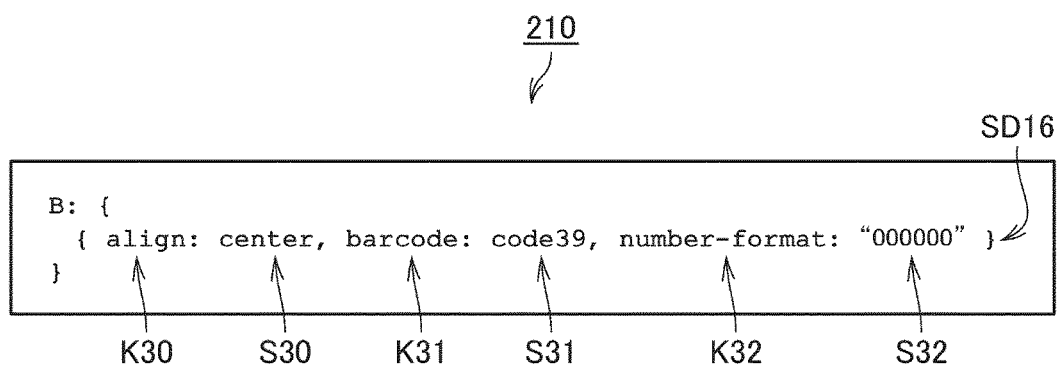
FIG. 22 shows an example of style data.

FIG. 22 shows an example of style data 210. More particularly, FIG. 22 shows the style data 210 identified based on the string M11 shown in FIG. 20.

The style data 210 shown in FIG. 21 comprises style data SD16. Style data SD16 is the style data 210 applied to substring BM26 in FIG. 20.

Style data SD16 relates the "align" property K30 to the property value S30 "center" corresponding to property K30; relates the "barcode" property K31 to the property value S31 "code39" corresponding to property K31; and relates the "number-format" property K32 to the property value S32 "000000" corresponding to property K32.

As described above, the "align" property defines the printing position of the substring relative to the width of the roll paper as left-aligned, centered, or right-aligned. In the style data SD16 shown in FIG. 22, the property value of the "align" property K30 is "center". A property value of "center" sets the printing position of the substring centered to the roll paper. Therefore, the "align:center" argument in style data SD16 defines the printing position of the substring as centered.

The "barcode" property specifies printing the substring in the barcode format (standard) indicated by the property value. In FIG. 22, the style data SD16 sets the property value of the "barcode" property K31 to "code39", where "code39" is the property value identifying Code 39 as the barcode standard to use. Therefore, in style data SD16, the "barcode: code39" argument specifies printing the substring as a Code 39 barcode.

As described above, the "number-format" property is the property specifying printing the sub string in the format indicated by the property value. In the style data SD16 shown in FIG. 22, the property value of the "number-format" property K31 is "000000". A property value of "00000" specifies printing the substring in the format "000000". Therefore, in style data SD16, the "number-format:"000000" argument specifies printing the substring "12301", for example, as "12301".

Therefore, the style data "align:center, barcode:code39, number-format: "000000" means printing a substring in the format "000000" as a Code 39 barcode, and printing the barcode center-aligned.

Once the style data shown in FIG. 22 is identified, the command string generator 201 generates a command string based on the style data 210 for each substring (step SB4). As described above, the string M11 shown in FIG. 20 includes substring BM26. The command string generator 201, for substring BM26, generates a command string based on style data SD16.

Style data SD16 is style data specifying printing a substring in the format "000000" as a Code 39 barcode that is printed centered on the roll paper. As a result, the command string generator 201 generates, for substring BM26 of string M11, a command string including a command for converting the substring 12301 formatted as "12301" to a Code 39 barcode, a command for printing the barcode centered, a command instructing printing, and substring BM26.

When a command string is generated for substring BM26, the command string generator 201 determines a command string was generated for all substrings in the line of string M12 (step SB5: YES). The command string generator 201 then determines if a command string was generated for all of the one or more lines included in the received CSV format print data (step SB6). In the example in FIG. 20, because there is a line of string M10, a line of string M11, and a line of string M12, once the command string generator 201 generates a command string for substring BM26, it goes to the next line containing string M12.

Once the command string generator 201 identifies the line of string M12, it identifies the style data 210 to apply to the first substring of the substrings in string M12 (step SB2). As shown in FIG. 20, the first substring in string M12 is the substring BM26 "C". As a result, the command string generator 201 identifies the style data 210 shown in FIG. 23.

Figure 23:
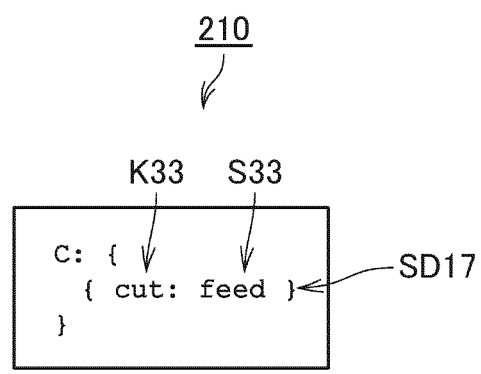
FIG. 23 shows an example of style data.

FIG. 23 shows an example of style data 210. More specifically, FIG. 21 shows the style data 210 identified based on string M12 in FIG. 20.

The style data 210 shown in FIG. 23 comprises style data SD17.

Style data SD17 relates the "cut" property K33 to the property value S33 "feed" corresponding to property K33.

The "cut" property specifies cutting the roll paper. In FIG. 23, the "cut" property is related to the property value "feed". The property value "feed" specifies conveying (feeding) the roll paper. Therefore, in style data SD16, the argument "cut:feed" means feeding and then cutting the roll paper. If the property value S33 "feed" is omitted, the roll paper is only cut.

Once the style data shown in FIG. 23 is identified, the command string generator 201 generates a command string based on the style data (step SB4). Style data SD16 is style data specifying cutting the roll paper. As a result, the command string generator 201 generates a command string including a command to advance the roll paper, and a command to cut the roll paper.

The command string generator 201 then ends the command string generating process after generating a command string for string M12.

When the command string generator 201 executes the command string generating process, command executor 202 renders image data based on the generated command string in the print buffer 23 (step SA4), and prints by the printing mechanism 22 (step SA5).

Figure 24:
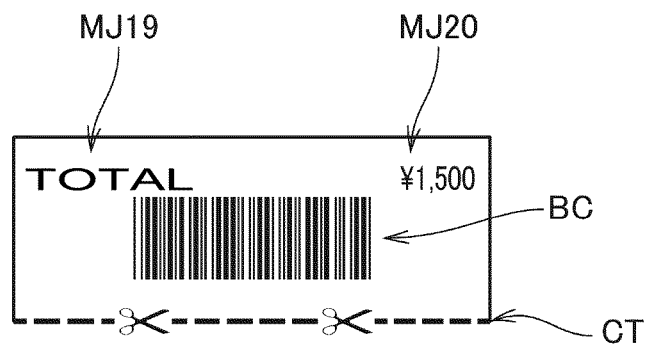
FIG. 24 shows an example of a printout.

FIG. 24 shows an example of the resulting printout. More particularly, the printout shown in FIG. 24 is the result of applying the command strings generates based on the style data in FIG. 21, FIG. 22, and FIG. 23 to the print data shown in FIG. 20.

As described above, the command string generator 201, for substring BM23 of string M10, generates a command string including a command instructing printing left-aligned using double-width characters. As a result, by executing the command string, the substring BM23 "TOTAL" is printed left-aligned with double-width characters as shown in FIG. 24 by the characters MJ19 "TOTAL".

In addition, the command string generator 201, for substring BM24 of string M10, generates a command string including a command setting the printing position to right-aligned, and a command instructing printing using the format "¥#,###". As a result, by executing the generated command string, the substring BM24 "1500", as indicated by the characters MJ20 "¥1,500" in FIG. 24 is printed right-aligned in the format "¥1, 500".

The command string generator 201, for substring BM26 of string M11, also generates a command string including a command for printing a Code 39 barcode representing a substring of format "12301" centered on the print medium. As a result, by executing the generated command string, the substring BM26 "12301" is printed as a barcode centered on the print medium as indicated by the barcode BC in FIG. 24.

For string M12, a command string instructing cutting the roll paper is generated. As a result, the roll paper is cut as indicated in FIG. 24 after printing the characters MJ19 "TOTAL", the characters MJ20 "¥1, 500", and the barcode BC.

Note that in FIG. 24 image CT indicates for convenience where the roll paper is cut, and does not represent an image printed on the roll paper.

As a result, using the first substring in the string as an identification string identifying style data 210, the command string generator 201 generates a command string based on the style data indicated by the first substring. Therefore, by receiving print data including a string in which the first substring is an ID string identifying style data, the printer 2 generates a command string based on the style data 210 corresponding to the ID string, and can print a receipt in a format desired by the user. Furthermore, by defining style data 210 for operating the cutter, and including a substring identifying the style data 210 in the print data, the printer 2, after feeding the paper so that the trailing end of the printed barcode is at the cutting position, can operate the cutter and produce a ticket. As a result, the user, by inserting in the print data a sub string identifying the style data instructing operating the cutter, can produce a ticket printed in a format desired by the user.

Note that example 6 describes operating a cutter, but other operations may be triggered, including controlling the notification unit 27 to output a report, controlling the customer display CD to display specific information, and controlling the cash drawer DR to kick-out the tray. In this case, the printer storage 21 stores style data 210 instructing the specific operations, and the print data includes a substring identifying the desired style data. As a result, by simply sending print data to the printer, the user can, for example, issue a report by the notification unit, display specific information on the customer display CD, and print in a format desired by the user.

As described above, the printer 2 (printing device) includes a receive buffer 24 that receives print data (string information); printer storage 21 (storage) that stores style data 210 (information indicating a style); a command string generator 201 that, for all substrings in every string in the print data received by the receive buffer 24, generates a command string including commands and substrings based on the style data 210; a command executor 202 that generates print data based on the commands in the command string generated by the command string generator 201; a print buffer 23 that stores the image data generated by the command executor 202; and a printing mechanism 22 that prints based on the image data stored in the print buffer 23.

Because the printer 2 thus generates a command string based on style data 210 for each substring in the strings contained in the print data, printing in the format desired by the user is possibly by simply receiving the print data. As a result, even when a printer driver is not installed on the tablet terminal 3, and when print data is sent without going through a printer driver, the printer 2 can print in the user-desired format. In other words, even in an environment that does not have a printer driver, the printer 2 can print in a user-desired format by simply receiving CSV format print data. The user does not need to insert or change commands on the application side. That is, the printer 2 can print in a user-desired format without encumbering the user.

The print data in these embodiments is CSV format print data. As described above, the CSV format is CSV data containing a string composed of substrings separated by a comma (,). The print data is thus plain text. The user can therefore easily edit the print data.

The string is delimited by commas. The style data 210 corresponds to the number of substrings. The command string generator 201 identifies the substrings based on the comma delimiter, and generates a command string based on the style data 210 according to the number of substrings delimited by commas.

In this configuration, because the printer 2 generates command strings based on style data corresponding to the number of substrings delimited by commas, strings can be printed appropriately to the number of substrings, and printing in a user-desired format is possible.

The printer storage 21 stores model information (printer information) including at least information about the number of printable columns per line on the roll paper (print medium). The command string generator 201 generates the command string based on the model information.

As a result, because the command string is generated based on model information including information about the number of printable columns, printing in the user-desired format appropriately to the string length is possible.

The printer storage 21 stores font data 212 (font information) corresponding to ASCII codes (first character code), and conversion information 213 for converting Unicode (second character code) to ASCII code. When the character codes of the strings in the print data received in the receive buffer 24 are Unicode, the command string generator 201 converts the Unicode to ASCII code based on the conversion information, and generates the command string. The command executor 202 generates image data based on the font information corresponding to the ASCII code.

As a result, because the printer 2 converts Unicode to ASCII code based on the conversion information 213 and generates a command string, printing in the user-desired format is possible even when print data expressing strings by character codes with which the printer 2 is not compatible.

The style data defines, for the substring, at least one of the printing position, character style, character size, number format, image printing, and symbol image.

Printing in a user-desired format is therefore possible because the style data 210 is data defining at least one of the printing position, character style, character size, number format, image printing, and symbol image.

The printer 2 also has at least one of a cutter for cutting the roll paper, a notification unit 27 for reporting information, and a device communicator 26 for driving a device.

The style data 210 is information specifying at least one of cutter operation, reporting information through the notification unit 27, and driving a device. The command executor 202, based on the command string, then operates the cutter, drives the notification unit 27, or drives another device.

As a result, because the style data 210 specifies at least one of cutter operation, reporting information through the notification unit 27, and driving a device, printing in a user-desired format is possible.

A string may also comprise an identification string (identification character) identifying specific style data. In this case, the command string generator 201 generates a command string based on style data 210 appropriate to the identification string in the string.

As a result, because the command string is generated based on style data 210 corresponding to the identification character in the string, the printer 2 can print in a user-desired format if the string in the print data includes an identification character.

Embodiments are described above with reference to a preferred embodiment thereof, but the embodiments are not limited thereto and can be modified and adapted in many ways without departing from the scope of the accompanying claims.

For example, the delimiter in the foregoing embodiments is a comma (,), and the print data is in CSV format. However, the embodiments are not so limited. For example, the delimiter may be a colon (:) or white space, and the print data may be any data comprising substrings.

Furthermore, when the control method of the printer 2 (control method of a printing device) is embodied by a computer in the printer 2, the embodiments described herein can also be implemented as a program the computer executes to implement the control method, by a computer-readable recording medium storing the program, or by communication media communicating the program. Examples of the recording medium include magnetic and optical media, as well as semiconductor memory devices. More specifically, removable media such as a floppy disk, HDD (Hard Disk Drive), CD-ROM (Compact Disk Read Only Memory), DVD (Digital Versatile Disk), BLUE-RAY Disc, magneto-optical disc, flash memory, or memory card media, or a fixed recording medium, may be used. The recording medium may also be an internal storage device of the printer 2 such as RAM (Random Access Memory), ROM (Read Only Memory), hard disk drive, or other nonvolatile storage device.

Furthermore, the processing units shown in FIG. 2 and FIG. 3 are segmented by process content in order to simplify understanding the process of the printer 2, and the embodiments described herein are not limited by the names and methods of segmenting the processing units. The processes of the printer 2 may be divided into more processing units appropriately to the process content. One processing unit can also be divided into more processes.

The function units shown in FIG. 1 illustrate desirable functional configurations, and specific configurations of the embodiments described herein are not limited thereto. More specifically, hardware components corresponding individually to each function unit are not necessarily required, and configurations in which a single processor embodies the functions of multiple function units by executing a specific program or programs are obviously conceivable. Some functions embodied by software in the foregoing embodiments may instead be embodied by hardware, and some functions embodied by hardware in the foregoing embodiments may instead be embodied by software. The detailed configuration of the printer 2 and tablet terminal 3 is also not limited to the foregoing, and may be changed without departing from the scope of the accompanying claims.

The embodiments being thus described, it will be obvious that it may be varied in many ways. Such variations are not to be regarded as a departure from the spirit and scope of the present disclosure, and all such modifications as would be obvious to one skilled in the art are intended to be included within the scope of the following claims.

What is claimed is:

1. A printer comprising:
a receive buffer configured to receive string information indicating a string including one or more substrings segmenting the string;
storage configured to store style information indicating one or more styles defined by one or more specific rules;
a processor configured to:
respectively generate, for each of the one or more substrings in the string information received by the receive buffer, a command string including a command and the substring based on the style information stored in the storage indicating a style of each substring,
execute the one or more commands included in the generated one or more command strings, and
generate image data; and
a printing mechanism configured to print based on the image data, wherein:
the storage is further configured to store font information for a first character code, and conversion information used to convert a second character code to the first character code, and
the processor is further configured to:
convert the second character code to the first character code based on the conversion information, and generate the one or more command strings, responsive to a determination that the character code of the string indicated by the string information the receive buffer received is the second character code, and
generate the image data based on the font information corresponding to the first character code.

2. The printer described in claim 1, wherein:
the string is segmented into the substrings by one or more delimiters;
at least one of the specific rules corresponds to a number of the substrings; and
the processor is configured to identify the substrings based on the one or more delimiters, and to generate the one or more command strings according to the style information based on the number of the substrings separated by the one or more delimiters.

3. The printer described in claim 1, wherein:
the storage stores at least printer information related to the printer and including information indicating the number of columns that can be printed on one line on a print medium;
at least one of the specific rules is related to the printer information; and
the processor is configured to reference the storage, and to generate the one or more command strings based on the at least one of the specific rules related to the printer information.

4. The printer described in claim 1, wherein:
the style information includes information specifying, for a substring, one or more of a printing position, a character style, a character size, a number format, an image printing, and a symbol image.

5. The printer described in claim 1, further comprising:
at least one of a cutter to cut a print medium, a notification unit to report information, and an external device driver to drive an external device; wherein
the style information includes information specifying at least one of operating the cutter, reporting by the notification unit, and driving the external device by the external device driver; and
the processor is configured to execute at least one of operating the cutter, reporting by the notification unit, and driving the external device by the external device driver, according to the one or more command strings.

6. The printer described in claim 1, wherein:
the string comprises an identification character identifying style information;
the storage stores the identification information character corresponding to the style; and
the processor is configured to generate the one or more command strings based on the style information corresponding to the identification character in the string.

7. A control method of a printer having a receive buffer configured to receive string information indicating a string including one or more substrings segmenting the string, and storage configured to store style information indicating one or more styles defined by one or more specific rules, comprising:
respectively generating, for each of the one or more substrings in the string information received by the receive buffer, a command string including a command and the substring based on the style information stored in the storage indicating a style of each substring;
executing the one or more commands included in the generated one or more command strings, and generating image data; and
printing based on the image data, wherein
the storage stores font information for a first character code, and conversion information used to convert a second character code to the first character code,
generating the one or more command strings comprises:
determining that a character code of the string indicated by the string information the receive buffer received is the second character code,
converting the second character code of the string to the first character code based on the conversion information, and
generating the one or more command strings; and
generating the image data is performed based on the font information corresponding to the first character code.

8. The control method of a printer described in claim 7 wherein:
the string is segmented into substrings by one or more delimiters;
at least one of the specific rules corresponds to the number of substrings; and
generating the one or more command strings comprises identifying the substrings based on the one or more delimiters, and generating the one or more command strings according to the style information based on the number of substrings separated by the one or more delimiters.

9. The control method of a printer described in claim 7, wherein:
the storage stores at least printer information related to the printer and including information indicating a number of columns that can be printed on one line on a print medium;
at least one of the specific rules is related to the printer information; and
generating the one or more command strings comprises referencing the storage, and generating the one or more command strings based on the at least one of the specific rules related to the printer information.

10. The control method of a printer described in claim 7, wherein:
the style information includes information specifying, for a substring, one or more of a printing position, a character style, a character size, a number format, an image printing, and a symbol image.

11. The control method of a printer described in claim 7, wherein:
the printer comprises at least one of a cutter to cut a print medium, a notification unit to report information, and an external device driver to drive an external device;
the style information includes information specifying at least one of operating the cutter, reporting by the notification unit, and driving the external device by the external device driver; and
the control method further comprises executing at least one of operating the cutter, reporting by the notification unit, and driving the external device by the external device driver according to the one or more command strings.

12. The control method of a printer described in claim 7, wherein:
the string comprises an identification character identifying style information;
the storage stores the identification character corresponding to the style information; and
generating the one or more command strings is performed based on the style information corresponding to the identification character in the string.

13. A printer comprising:
a receive buffer configured to receive string information indicating a string including substrings segmenting the string, wherein the string is segmented into the substrings by at least one delimiter, and at least some characters in the string are character codes that relate to font information;
storage configured to store style information indicating one or more styles defined by one or more specific rules, and to store the font information related to the character codes;
a processor configured to:
generate, for one or more of the substrings in the string information received by the receive buffer, a command string including a command and the one or more of the substrings based on the style information stored in the storage indicating a style of the one or more of the substrings,
execute the one or more commands included in the generated command string, and
generate image data by referencing the font information in the storage; and
a printing mechanism configured to print based on the image data,
wherein the processor is configured to generate the command string according to the style information, which is applied according to an order of the one or more of the substrings.

14. The printer described in claim 13, wherein the font information includes font data for expressing characters in a form that can be printed on roll paper.

15. The printer described in claim 14, wherein the font data is bitmap font data.

16. A control method of a printer having a receive buffer configured to receive string information indicating a string including substrings segmenting the string, wherein the string is segmented into the substrings by at least one delimiter, and at least some characters in the string are character codes that relate to font information, and storage configured to store style information indicating one or more styles defined by one or more specific rules, and to store the font information related to the character codes, comprising:

generating, for one or more of the substrings in the string information received by the receive buffer, a command string including a command and the one or more of the substrings based on the style information stored in the storage indicating a style of the one or more of the substrings;

executing the one or more commands included in the generated command string, and generating image data by referencing the font information in the storage; and printing based on the image data, wherein the command string is generated according to the style information, which is applied according to an order of the one or more of the substrings.

17. The control method of a printer described in claim 16, wherein the font information includes font data for expressing characters in a form that can be printed on roll paper.

18. The control method of a printer described in claim 17, wherein the font data is bitmap font data.

* * * * *